US010725923B1

United States Patent
Ma et al.

(10) Patent No.: US 10,725,923 B1
(45) Date of Patent: Jul. 28, 2020

(54) CACHE ACCESS DETECTION AND PREDICTION

(71) Applicant: Arm Limited, Cambridge (GB)

(72) Inventors: Lei Ma, Cambridge (GB); Alexander Alfred Hornung, Cambridge (GB); Ian Michael Caulfield, Cambridge (GB)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 16/267,613

(22) Filed: Feb. 5, 2019

(51) Int. Cl.
  *G06F 12/08* (2016.01)
  *G06F 12/0871* (2016.01)
  *G06F 12/0877* (2016.01)
  *G06F 12/0895* (2016.01)

(52) U.S. Cl.
  CPC ...... *G06F 12/0871* (2013.01); *G06F 12/0877* (2013.01); *G06F 12/0895* (2013.01)

(58) Field of Classification Search
  CPC ............. G06F 12/0871; G06F 12/0877; G06F 12/0895
  See application file for complete search history.

(56) References Cited

U.S. PATENT DOCUMENTS

| 6,272,598 | B1* | 8/2001 | Arlitt | ................... | G06F 16/9574 |
| | | | | | 711/133 |
| 2007/0143546 | A1* | 6/2007 | Narad | ................... | G06F 12/084 |
| | | | | | 711/130 |
| 2010/0318742 | A1* | 12/2010 | Plondke | ................ | G06F 12/1036 |
| | | | | | 711/123 |
| 2014/0244932 | A1* | 8/2014 | Hebbar | ................ | G06F 12/0875 |
| | | | | | 711/122 |
| 2015/0106556 | A1* | 4/2015 | Yu | ......................... | G11C 16/349 |
| | | | | | 711/103 |
| 2016/0147443 | A1* | 5/2016 | van Riel | ................. | G06F 3/061 |
| 2017/0357588 | A1* | 12/2017 | Moyer | .................. | G06F 12/123 |

(Continued)

*Primary Examiner* — Hiep T Nguyen
(74) *Attorney, Agent, or Firm* — Nixon & Vanderhye P.C.

(57) ABSTRACT

An apparatus comprises a cache memory to store data as a plurality of cache lines each having a data size and an associated physical address in a memory, access circuitry to access the data stored in the cache memory, detection circuitry to detect, for at least a set of sub-units of the cache lines stored in the cache memory, whether a number of accesses by the access circuitry to a given sub-unit exceeds a predetermined threshold, in which each sub-unit has a data size that is smaller than the data size of a cache line, prediction circuitry to generate a prediction, for a given region of a plurality of regions of physical address space, of whether data stored in that region comprises streaming data in which each of one or more portions of the given cache line is predicted to be subject to a maximum of one read operation or multiple access data in which each of the one or more portions of the given cache line is predicted to be subject to more than one read operation, the prediction circuitry being configured to generate the prediction in response to a detection by the detection circuitry of whether the number of accesses to a sub-unit of a cache line having an associated physical address in the given region exceeds the predetermined threshold, and allocation circuitry to selectively allocate a next cache line to the cache memory in dependence upon the prediction applicable to the region of physical address space containing that next cache line.

20 Claims, 12 Drawing Sheets

(56) References Cited

U.S. PATENT DOCUMENTS

2018/0018266 A1\* 1/2018 Jones, III ............ G06F 12/0862
2018/0095895 A1\* 4/2018 Pugsley ................ G06F 12/126
2018/0302105 A1\* 10/2018 Kalamatianos ..... G06F 11/1064

\* cited by examiner

Cache Access Tracking Table

| Row Number | TAG | Sub-unit a no.of accesses | ..... | Sub-unit x no.of accesses | Age |
|---|---|---|---|---|---|
| 1 | | | | | |
| 2 | | | | | |
| 3 | | | | | |
| .... | | | | | |
| N | | | | | |

FIG. 3

CACHE ACCESS DETECTION AND PREDICTION

The present disclosure relates to data processing. More particularly this disclosure relates to a method and an apparatus for detecting accesses to data stored in memory and generating a prediction.

It is known to provide a data processing apparatus with one or more instances of processing circuitry and one or more memories of a variety of different forms for storing data values to be manipulated. The forms of memory may include, for example, main memories, level 1 cache memories, level 2 cache memories, level 3 cache memories and buffer memories. Data values corresponding to a given memory address within the physical memory address space can be copied from a main memory to a cache memory and accessed from the cache memory.

Various modes of operation of a cache memory have been proposed, but a generally common feature is that a cache memory is smaller than the main or higher level memory which it supports. The smaller size of the cache memory means that data values can be stored in the cache memory and accessed from the cache memory by a processor core to reduce latency associated with accessing the data values. However, the size of the cache memory can mean that the processor core sometimes attempts to access data that is not currently stored in the cache memory—known as a cache miss—in which case the data value must be copied from the higher level memory to the cache memory and subsequently accessed by the processor core which results in increased latency.

A cache memory typically stores data as a plurality of cache lines or blocks of data, and when a new cache line is copied to the cache memory and the cache memory is already fully occupied another cache line stored by the cache memory will be evicted from the cache memory. It is known to provide a range of different techniques for identifying which data should preferentially be evicted from a cache memory. However, typical cache replacement policies, such as least-recently-used (LRU), can give rise to a scenario known as cache thrashing in which useful data is evicted from the cache memory and subsequently copied to the memory again for subsequent access by the processor core. It is therefore desirable to improve cache performance.

SUMMARY

In one example arrangement, there is provided an apparatus comprising:

a cache memory to store data as a plurality of cache lines each having a data size and an associated physical address in a memory;

access circuitry to access the data stored in the cache memory;

detection circuitry to detect, for at least a set of sub-units of the cache lines stored in the cache memory, whether a number of accesses by the access circuitry to a given sub-unit exceeds a predetermined threshold, in which each sub-unit has a data size that is smaller than the data size of a cache line;

prediction circuitry to generate a prediction, for a given region of a plurality of regions of physical address space, of whether data stored in that region comprises streaming data in which each of one or more portions of the given cache line is predicted to be subject to a maximum of one read operation or multiple access data in which each of the one or more portions of the given cache line is predicted to be subject to more than one read operation, the prediction circuitry being configured to generate the prediction in response to a detection by the detection circuitry of whether the number of accesses to a sub-unit of a cache line having an associated physical address in the given region exceeds the predetermined threshold; and allocation circuitry to selectively allocate a next cache line to the cache memory in dependence upon the prediction applicable to the region of physical address space containing that next cache line.

In another example arrangement there is provided a method comprising:

storing, in a cache memory, data as a plurality of cache lines each having a data size and an associated physical address in a memory;

accessing the data stored in the cache memory;

detecting, for at least a set of sub-units of the cache lines stored in the cache memory, whether a number of accesses to a given sub-unit exceeds a predetermined threshold, in which each sub-unit has a data size that is smaller than the data size of a cache line;

generating a prediction, for a given region of a plurality of regions of physical address space, of whether data stored in that region comprises streaming data in which each of one or more portions of the given cache line is predicted to be subject to a maximum of one subsequent read operation or multiple-access data in which each of the one or more portions of the given cache line is predicted to be subject to more than one subsequent read operation, in which the prediction is generated in response to a detection of whether the number of accesses to a sub-unit of a cache line having an associated physical address in the given region exceeds the predetermined threshold; and selectively allocating a next cache line to the cache memory in dependence upon the prediction applicable to the region of physical address space containing that next cache line.

In another example arrangement there is provided a non-transitory computer program product providing a computer program which, when executed on a computer, performs a method in accordance with the above mentioned example arrangement.

In another example arrangement, there is provided circuitry comprising:

a cache memory to store data as a set of cache lines, the cache memory having a first cache portion and second cache portion, the first and second cache portions having different cache line eviction policies; and control circuitry, responsive to a prediction of whether a given cache line to be newly stored in the cache memory comprises streaming data in which each of one or more portions of the given cache line is predicted to be subject to a maximum of one subsequent read operation or multiple access data in which each of the one or more portions of the given cache line is predicted to be subject to more than one subsequent read operation, to store the given cache line in the first cache portion when the prediction indicates that the given cache line comprises streaming data and to store the given cache line in the second cache portion when the prediction indicates that the given cache line comprises multiple-access data.

In another example arrangement there is provided a method comprising:

storing data as a set of cache lines in a cache memory having a first cache portion and second cache portion, the first and second cache portions having different cache line eviction policies; and responsive to a prediction of whether a given cache line to be newly stored in the cache memory comprises streaming data in which each of one or more portions of the given cache line is predicted to be subject to a maximum of one subsequent read operation or multiple access data in which each of the one or more portions of the given cache line is predicted to be subject to more than one subsequent read operation, storing the given cache line in the first cache portion when the prediction indicates that the given cache line comprises streaming data and storing the given cache line in the second cache portion when the prediction indicates that the given cache line comprises multiple-access data.

Further respective aspects and features of the present technology are defined by the appended claims.

BRIEF DESCRIPTION OF THE DRAWINGS

The present technique will be described further, by way of example only, with reference to embodiments thereof as illustrated in the accompanying drawings, in which:

FIG. 3 schematically illustrates an example of a cache access tracking table;

DESCRIPTION OF EMBODIMENTS

Figure 1A:
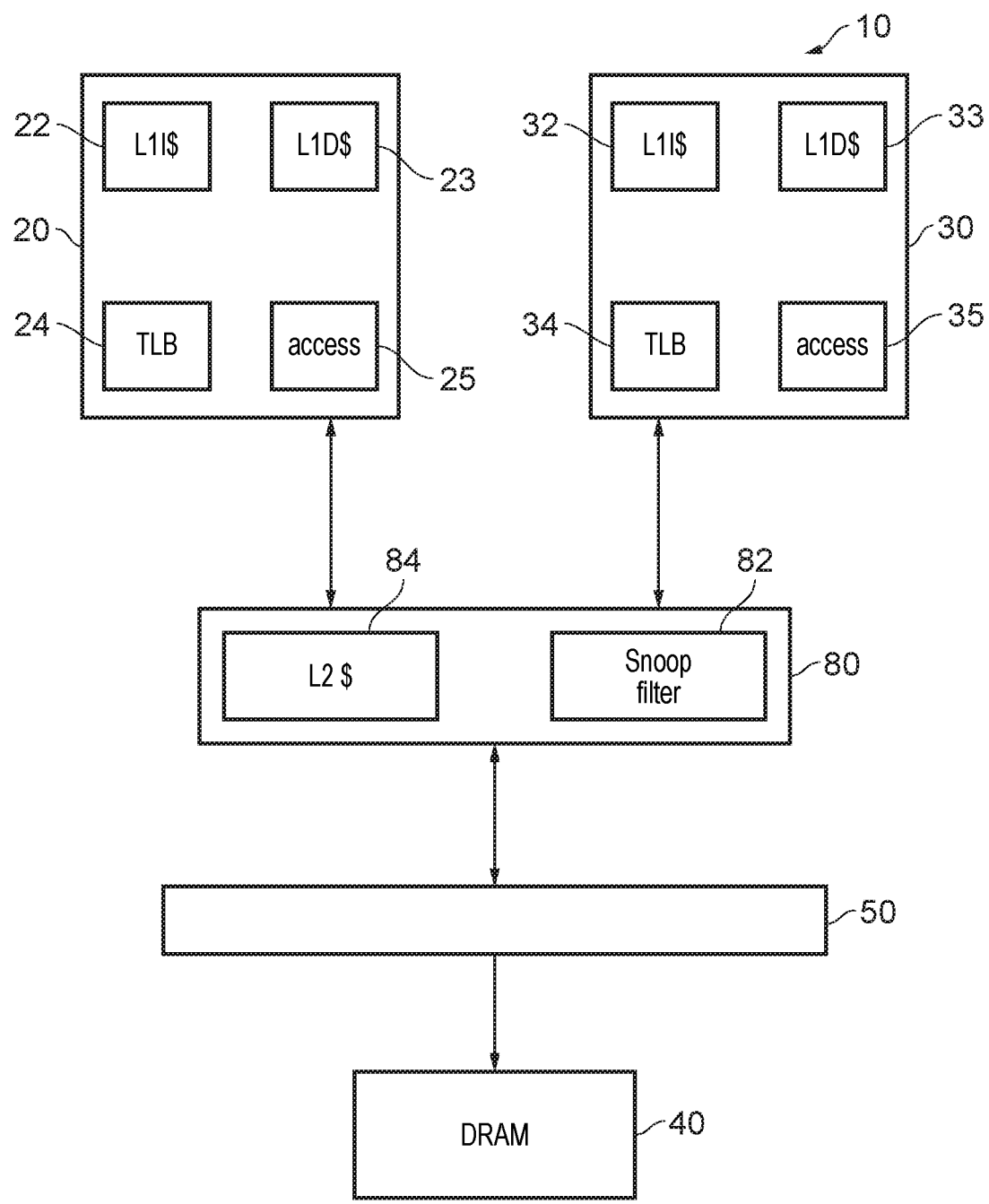
FIG. 1a schematically illustrates an example data processing system.

Before discussing the embodiments with reference to the accompanying figures, the following description of embodiments is provided.

An example embodiment provides an apparatus comprising:

a cache memory to store data as a plurality of cache lines each having a data size and an associated physical address in a memory;

access circuitry to access the data stored in the cache memory;

detection circuitry to detect, for at least a set of sub-units of the cache lines stored in the cache memory, whether a number of accesses by the access circuitry to a given sub-unit exceeds a predetermined threshold, in which each sub-unit has a data size that is smaller than the data size of a cache line;

prediction circuitry to generate a prediction, for a given region of a plurality of regions of physical address space, of whether data stored in that region comprises streaming data in which each of one or more portions of the given cache line is predicted to be subject to a maximum of one read operation or multiple-access data in which each of the one or more portions of the given cache line is predicted to be subject to more than one read operation, the prediction circuitry being configured to generate the prediction in response to a detection by the detection circuitry of whether the number of accesses to a sub-unit of a cache line having an associated physical address in the given region exceeds the predetermined threshold; and allocation circuitry to selectively allocate a next cache line to the cache memory in dependence upon the prediction applicable to the region of physical address space containing that next cache line.

Example embodiments provide access circuitry to access data stored in the cache memory, and detection circuitry to detect whether a number of accesses by the access circuitry to a given sub-unit of a cache line stored in the cache memory exceeds a predetermined threshold. The cache memory stores a plurality of cache lines, where each cache line has a data size and an associated physical address in a memory. Each cache line comprises a plurality of sub-units such that each sub-unit has a data size that is smaller than the data size of the cache line. For example, the cache lines stored within the cache memory may each have a data size of 512 bits, and each cache line may comprise 8 sub-units each having a data size of 64 bits, so that the detection can be performed by the detection circuitry using a sub-unit granularity rather than using a cache line granularity. Other cache line data sizes and sub-unit data sizes are possible, and in some examples the sub-units might have a data size of 8 or 16 bits. For at least some of the cache lines stored in the cache memory, the detection circuitry can detect whether a number of accesses by the access circuitry to a given sub-unit of a cache line exceeds the predetermined threshold, and a prediction can be generated for a region of physical address space associated with the cache line of whether data stored in that region comprises (or currently holds) a type of data referred to as "streaming" data or another type referred to as "multiple-access" data.

A cache line comprising streaming data will have a plurality of sub-units that are each subjected to a maximum of one read operation. This is indicative of a so-called streaming operation in which data is transferred, generally at a steady and potentially high-speed rate in order for the data to be output (for example as a video signal or audio signal output) or stored (for example to a backup drive or the like). In terms of the use of a cache, streaming data in this context can be assumed to be written into the cache and read out once.

A cache line comprising multiple-access data will have a plurality of sub-units for which at least one sub-unit is typically subjected to more than one read operation. Examples here could include data representing operands for a data processing calculation.

In the present arrangements, a prediction is made as to whether a memory region currently holds streaming data or multiple access data. In example embodiments this can be achieved by detecting whether a given sub-unit stored by the cache memory is accessed more than the predetermined threshold number of times, and the prediction can be generated from that detection for a region of physical address space (for example, including at least that sub-unit) of whether the region stores data comprising streaming data or multiple-access data. Therefore, for a next cache line to be copied to the cache memory, the allocation circuitry can selectively allocate the next cache line to the cache memory in dependence upon the prediction generated for the region of physical address space containing that next cache line.

Therefore, example embodiments of the present disclosure can make use of an assumption that if one or more individual sub-units within a larger region can be classified as multiple-access data, then it is likely that the remainder of that region can be similarly classified. This is a prediction; it may or may not be that the prediction is correct in a particular case, but overall processing advantages can potentially be obtained assuming that the prediction is at least more accurate than it is inaccurate.

In example embodiments, the predetermined threshold is one. The predetermined threshold can be set so that the detection circuitry detects whether the number of accesses by the access circuitry to a given sub-unit is greater than one and the prediction circuitry can generate the prediction, for the region of physical address space associated with the cache line comprising the given sub-unit, of whether the data stored in that region comprises streaming data or multiple-access data. When the number of accesses by the access circuitry to a given sub-unit of a given cache line is greater than one, this is an indication that the cache line comprises multiple-access data (non-streaming data). In this case, the prediction generated for the region of physical address space associated with the cache line can be generated to acknowledge that at least the given sub-unit associated with the region of the physical address space comprises data predicted to be multiple-access data.

In example embodiments, each region of physical address space is larger than one cache line. In other words, a prediction is made as discussed above and is applied to a region larger than the cache line from which data underlying the prediction is derived. The cache memory is configured to store data as a plurality of cache lines each having a data size, and data is copied to the cache memory from a higher level memory (e.g. main memory) that comprises a plurality of regions of physical address space, where each region of physical address space supports a data size that is larger than the data size of one cache line. Therefore, the cache memory is capable of storing a plurality of cache lines, and at any given time a number of cache lines stored by the cache memory may have an associated physical address within the same region of physical address space. This means that the prediction can be generated for a given region of physical address space based on a detection of a number of accesses to each respective sub-unit of a given cache line, and a plurality of respective cache lines may associated with the given region of the physical address space.

In example embodiments, the detection circuitry is configured to store indicator data indicative of at least a first access to a sub-unit in the set of sub-units, and to detect a subsequent access to a sub-unit in response to the stored indicator data. Each cache line stored by the cache memory comprises a plurality of sub-units that can be accessed by the access circuitry, and at least a set of sub-units of the cache lines stored in the cache memory can be tracked by the detection circuitry by storing indicator data for each sub-unit in the set of sub-units. The detection circuitry can store the indicator data for each sub-unit in the set of sub-units to provide an indication of whether a given sub-unit is accessed more than the predetermined threshold number of times. Upon storing a new cache line in the cache memory (i.e. on a fill into the cache memory), the indicator data can be stored for each sub-unit of the newly added cache line, and the indicator data for a given sub-unit can be updated in response to a detection of a first access to the given sub-unit. A subsequent update to the indicator data for the given sub-unit indicates that the given sub-unit is accessed more than once, and when the threshold is set to one a detection of a subsequent update to the indicator data after a first update means that the detection circuitry detects that a number of accesses by the access circuitry to the sub-unit exceeds the predetermined threshold. In this way, the indicator data for a given sub-unit can be used by the detection circuitry to detect whether the number of accesses to the sub-unit exceeds the predetermined threshold.

For example, the detection circuitry can be configured to detect, for each sub-unit of the N most recently added cache lines, whether a number of accesses by the access circuitry to a given sub-unit of each of the N cache lines exceeds a predetermined threshold by storing indicator data for each sub-unit of the N cache lines. As such, the detection circuitry may for example store indicator data comprising an N×U array of entries, where U is equal to the number of sub-units per cache line and N is equal to the total number of cache lines tracked at any given time. In some examples, N may be equal to the total number of cache lines stored by the cache memory so that all of the stored cache lines stored by the cache memory are tracked by the detection circuitry. In other examples N may be less than the total number of cache lines stored by the cache memory such that just a set of sub-units of the stored cache lines is tracked by the detection circuitry. In the case where N is less than the total number of cache lines stored by the cache memory, only the N most recently added cache lines are tracked by storing indicator data for the sub-units forming the N most recently added cache lines.

In example embodiments, the detection circuitry is configured to invalidate the stored indicator data for a given sub-unit in response to one or more from the list consisting of: a detection that a number of accesses by the access circuitry to the given sub-unit exceeds the predetermined threshold; and a detection that the cache line comprising the given sub-unit has been evicted from the cache memory. A comparison of the stored indicator data for a given sub-unit with the predetermined threshold can be used to determine whether the given sub-unit is accessed more than the predetermined threshold number of times. The detection circuitry can detect when a sub-unit is accessed by the access circuitry more than the predetermined threshold number of times, and such a detection indicates that the sub-unit comprises multiple-access data. Therefore, in response to a detection that a number of accesses by the access circuitry to a given sub-unit exceeds the predetermined threshold, the indicator data for the given sub-unit can be invalidated so that the indicator data in no longer stored for that sub-unit, because further detection of access to the sub-unit is not required to determine whether the sub-unit comprises multiple-access data. Upon detecting that the number of accesses by the access circuitry to a given sub-unit exceeds the predetermined threshold, the indicator data for the sub-unit can be invalidated and count data stored for an associated region of the plurality of regions of the physical address space can be updated accordingly to indicate the presence of multiple-access data, as will be discussed further below. The cache memory is configured to store a plurality of cache lines, and the total number of cache lines that can be stored is dependent upon the size of the cache memory. When a new cache line is to be stored by the cache memory and the cache memory is fully occupied, another cache line will be evicted from the cache memory. For the cache line that is evicted from the cache memory, the indicator data for the sub-units forming that cache line will be invalidated. Upon invalidating the indicator data for the sub-units of the evicted cache line, the count data stored for an associated region of the plurality of regions of the physical address space may be updated depending on the properties of the indicator data at the time when the indicator data is invalidated, as will be discussed further below.

In example embodiments, the prediction circuitry is configured to store count data for at least the given region of the physical address space in the memory, the count data indicative of a number of sub-units having an associated physical address in the given region for which the number of accesses by the access circuitry exceeds the predetermined threshold. At least a set of sub-units of the cache lines stored in the cache memory can be tracked using the stored indicator data, and the count data stored for the given region of the physical address space in the memory can be updated based on the indicator data. Therefore, using the count data the prediction circuitry can generate a prediction of whether the data stored in the given region comprises streaming data or multiple-access data. The count data for the given region may be updated in response to a detection that the number of accesses by the access circuitry to a given sub-unit exceeds a predetermined threshold so as to keep a continuous count of the total number of sub-units detected as comprising multiple-access data. As such, the count data stored for the given region of the physical address space can provide an indication of the number of sub-units having an associated physical address in the given region for which the number of accesses by the access circuitry exceeds the predetermined threshold, which allows a prediction to be generated based on the count data for the given region of whether data stored in that region comprises streaming data or multiple-access data.

In example embodiments, the prediction circuitry is configured to store count data for each region of the plurality of regions of the physical address space in the memory.

In example embodiments, the prediction circuitry is configured to update the count data for the given region to indicate a greater number of sub-units in response to a first detection that a number of accesses by the access circuitry to a given sub-unit having an associated physical address in the given region exceeds the predetermined threshold number. The detection circuitry can detect whether a number of accesses by the access circuitry to a given sub-unit exceeds the predetermined threshold and in response to a first detection, by the detection circuitry, that the number of accesses by the access circuitry to a given sub-unit exceeds the predetermined threshold, the prediction circuitry can update the count data for the given region. This means that for each sub-unit having an associated physical address in the given region, the count data for the given region is updated no more than once. The count data for the region therefore provides an indication of a number of sub-units detected to comprise multiple-access data. As discussed previously, the detection circuitry can be configured to invalidate the stored indicator data for a given sub-unit in response to a detection that the number of accesses by the access circuitry to a given sub-unit exceeds the predetermined threshold. As such, in response to a first detection by the detection circuitry that the number of accesses by the access circuitry to a given sub-unit exceeds the predetermined threshold, the prediction circuitry can update the count data for the given region and the detection circuitry can invalidate the indicator data stored for the given sub-unit.

In example embodiments, the prediction circuitry is configured to update count data for the given region to indicate a smaller number of sub-units in response to a detection that a cache line comprising a sub-unit having an associated physical address in the given region is evicted from the cache memory when a number of accesses by the access circuitry to the sub-unit is less than or equal to the predetermined threshold. The detection circuitry is configured to invalidate the indicator data for a given sub-unit either when the number of accesses by the access circuitry to a given sub-unit exceeds the predetermined threshold or when the detection circuitry detects that a cache line comprising the given sub-unit has been evicted from the cache memory. When the detection circuitry invalidates the stored indicator data for a given sub-unit in response to a detection that a number of accesses by the access circuitry to a given sub-unit exceeds a predetermined threshold, the prediction circuitry can update the count data for the given region in a manner that indicates the presence of multiple-access data by indicating a greater number of sub-units. When the detection circuitry invalidates the stored indicator data for a given sub-unit in response to a detection that the cache line containing that sub-unit has been evicted from the cache memory and a number of accesses by the access circuitry to each sub-unit forming the cache line is less than or equal to the predetermined threshold, the prediction circuitry can update the count data for the given region in a manner that indicates a smaller number of sub-units. As such, the prediction circuitry will not update the count data for the given region in response to a detection that a cache line has been evicted from the cache memory and at least one of the sub-units of the cache line has been accessed by the access circuitry more than the predetermined threshold number of times. Therefore, the prediction circuitry can be configured, in dependence upon whether a number of accesses by the access circuitry to each other sub-unit of that cache line exceeds the predetermined threshold, to update the count data for the given region to indicate a smaller number of sub-units in response to a detection that a cache line comprising has been evicted from the cache memory.

Another example embodiment provides a method comprising: storing, in a cache memory, data as a plurality of cache lines each having a data size and an associated physical address in a memory;

accessing the data stored in the cache memory;

detecting, for at least a set of sub-units of the cache lines stored in the cache memory, whether a number of accesses to a given sub-unit exceeds a predetermined threshold, in which each sub-unit has a data size that is smaller than the data size of a cache line;

generating a prediction, for a given region of a plurality of regions of physical address space, of whether data stored in that region comprises streaming data in which each of one or more portions of the given cache line is predicted to be subject to a maximum of one subsequent read operation or multiple-access data in which each of the one or more portions of the given cache line is predicted to be subject to more than one subsequent read operation, in which the prediction is generated in response to a detection of whether the number of accesses to a sub-unit of a cache line having an associated physical address in the given region exceeds the predetermined threshold; and selectively allocating a next cache line to the cache memory in dependence upon the prediction applicable to the region of physical address space containing that next cache line.

Another example embodiment provides circuitry comprising:

a cache memory configured to store data as a set of cache lines, the cache memory having a first cache portion and second cache portion, the first and second cache portions having different cache line eviction policies;

control circuitry, responsive to a prediction of whether a given cache line to be newly stored in the cache memory comprises streaming data in which each of one or more portions of the given cache line is predicted to be subject to a maximum of one subsequent read operation or multiple-access data in which each of the one or more portions of the given cache line is predicted to be subject to more than one subsequent read operation, to store the given cache line in the first cache portion when the prediction indicates that the given cache line comprises streaming data and to store the given cache line in the second cache portion when the prediction indicates that the given cache line comprises multiple-access data.

In these example embodiments, a prediction (which may be generated by the example embodiments discussed above, or provided separately) of whether a memory region comprises or holds streaming data is used to steer or influence the storage of data from that memory region into one of two or more cache portions having different respective cache line eviction policies. This advantageously allows, for example, data predicted as streaming data (which is predicted to be read from the cache only once) to be stored in a cache region with an eviction policy making that data a priority for eviction compared to data predicted to be multiple access data (which may need to be retained for longer in the cache to allow for multiple accesses).

In example embodiments, a next cache line can be stored in the cache memory having the first cache portion and the second cache portion, and the control circuitry is provided to selectively store the next cache line in either the first cache portion or the second cache portion responsive to a prediction of whether the new cache line comprises streaming data or multiple-access data. The prediction of whether the new cache line comprises streaming data or multiple-access data is generated in accordance with the prediction generated by the prediction circuitry, as discussed above. For a new cache line, the physical address associated with the new cache line can be used to determine a corresponding region of the physical address space in the memory, and the control circuitry can store the new cache line responsive to the prediction generated for the corresponding region of the physical address space, where the new cache line is associated with the given region based on physical address matching. Therefore, when the new cache line corresponds to a region of the physical address space predicted to comprise streaming data, the control circuitry stores the new cache line in the first cache portion of the cache memory, and when the new cache line corresponds to a region of the physical address space predicted to comprise multiple-access data the control circuitry stores the new cache line in the second cache portion of the cache memory.

The first cache portion of the cache memory is configured to store data as a set of cache lines having a first cache line eviction policy, and the second cache portion of the cache memory is configured to store data as a set of cache lines having a second cache line eviction policy, where the first cache line eviction policy is different to the second cache line eviction policy so that cache lines stored in the first cache portion are evicted based on a criterion that is different to that used for the second cache portion. Therefore, the control circuitry can store a new cache line predicted to comprise streaming data in the first cache portion and the new cache line may subsequently be evicted from the cache memory based on the first cache line eviction policy. Similarly, the control circuitry can store a new cache line predicted to comprise multiple-access data in the second cache portion and the second cache line may subsequently be evicted from the cache memory based on the second cache line eviction policy.

In example embodiments, the first cache portion and the second cache portion each comprise a respective memory region, and the first cache portion holds a smaller number of cache lines than the second cache portion. The first cache portion and the second cache portion may each comprise a respective memory region such that each cache portion has a memory region that is not shared with the other cache portion, where the memory region associated with the first cache portion has a smaller size than the memory region associated with the second cache portion. Therefore, cache lines predicted to comprise streaming data can be stored separately from cache lines predicted to comprise multiple-access data using the respective memory regions. This means that the memory of the first cache portion can be used solely for storing cache lines predicted to comprise streaming data and the memory of the second cache portion can be used solely for storing cache lines predicted to comprise multiple-access data. For a cache line in which the respective sub-units comprise streaming data, the respective sub-units will each typically be read just once and will most likely be read sequentially with respect to each other. Therefore, the first cache portion provides suitable storage for temporarily holding cache lines comprising streaming data which can be read once and subsequently evicted using an age based cache line eviction policy.

In example embodiments, the control circuitry is configured, in response to a detection that the first cache portion is fully occupied when the given cache line is to be newly stored in the first cache portion, to evict an earliest-stored cache line from the first cache portion. When the memory region associated with the first cache portion is fully occupied and a new cache line is to be stored in the first cache portion, a stored cache line can be evicted from the first cache portion to allow the new cache line to be stored by the cache memory in the first cache portion. For a new cache line predicted to comprise streaming data, which is to be stored in the first cache portion, the control circuitry can select one cache line from the plurality of cache lines stored by the cache memory in the first cache portion based on the age of the stored cache lines so as to evict the oldest cache line from the first cache portion. Similarly, in response to a detection that the second cache portion is fully occupied when the given cache line is to be newly stored in the second cache portion, a stored cache line can be evicted from the second cache portion using a second cache line eviction policy that is different to that used by the first cache portion.

In example embodiments, the circuitry comprises read circuitry to retrieve a required cache line from the cache memory, the read circuitry being configured to detect whether the required cache line is stored in either the first cache portion or the second cache portion. The read circuitry can access and subsequently read a stored cache line in the first cache portion or the second cache portion. When a stored cache line is required to be read, the read circuitry can detect whether the required cache line is stored in the first cache portion or the second cache portion and the cache line can be retrieved from either of the cache portions by the read circuitry in order to read the cache line.

In example embodiments, the cache memory comprises a memory region common to the first and second cache portions, the cache memory being configured to store flag data associated with a stored cache line to indicate whether that stored cache line is in the first cache portion or the second cache portion. The cache memory may comprise a region which is shared by both the first and second cache portions and used to store cache lines. In this case, flag data can be stored in association with a stored cache line to indicate whether the stored cache line in the share memory region is in the first cache portion or the second cache portion. In this way, a stored cache line in the first cache portion can be distinguished from a stored cache line in the second cache portion on the basis of the flag data, so that a stored cache line predicted to comprise streaming data is distinguishable from a stored cache line predicted to comprise multiple-access data. For example, the flag data may be stored in association with each stored cache line in the first cache portion, while the stored cache lines in the second cache portion may not be stored with associated flag data, so that a stored cache line in the first cache portion can be distinguished from a stored cache line in the second cache portion based on a detection of a presence of flag data associated with a stored cache line.

In example embodiments, the control circuitry is configured, in response to a detection that the memory region common to the first and second cache portions is fully occupied when the given cache line is to be newly stored in the memory region, to evict any stored cache line in the first cache portion. Cache lines stored in the memory region common to the first and second cache portions can be evicted from the common memory region on the basis of the flag data associated with a cache line so as to select a cache line in the first cache portion for eviction. Therefore, when the memory region common to the first and second cache portions is fully occupied and a new cache line is to be stored in the shared memory region, the control circuitry can evict any cache line that is in the first cache portion to allow the new cache line to be stored in the memory region. This means that a stored cache line in the second cache portion can be preferentially stored in the cache while a stored cache line in the first cache portion can be preferentially evicted from the cache, as the stored cache line in the second cache portion is predicted to comprise multiple-access data. For the case where the memory region common to the first and second cache portions stores a plurality of cache lines in the first cache portion, using the flag data one cache line can be randomly selected for eviction from any of the plurality of cache lines in the first cache portion. In this way, a cache line that is predicted to comprise streaming data can be preferentially evicted from the memory region common to the first and second cache portions when the memory region is fully occupied. For the case where the memory region common to the first and second cache portions is fully occupied and none of the stored cache lines are in the first cache portion, the control circuitry can be configured to select an earliest-stored cache line in the second cache portion for eviction.

In example embodiments, the control circuitry is configured, in response to a detection that the memory region common to the first and second cache portions is fully occupied when the given cache line is to be newly stored in the memory region, to evict an earliest-stored cache line in the first cache portion. Using the flag data associated with a cache line and an age associated with each cache line, the control circuitry can select an oldest cache line in the first cache portion for eviction when the memory region common to the first and second cache portions is fully occupied and a new cache line is to be stored in the memory region. For example, the control circuitry can firstly distinguish between stored cache lines in the first cache portion and the second cache portion on the basis of the flag data to identify stored cache lines in the first cache portion, and of the stored cache lines in the first cache portion one cache line can then be selected for eviction by identifying the oldest cache line.

In example embodiments, the cache memory is an n-way set associative cache memory in which each set comprises n cache lines and at least one cache line from the set of cache lines is in the first cache portion, and the control circuitry is configured, in response to a detection that the memory region common to the first and second cache portions is fully occupied when the given cache line is to be newly stored in the memory region, to evict the stored cache line in the first cache portion.

In example embodiments, each cache line has a data size and an associated physical address in a memory;

the circuitry comprising:

access circuitry to access the data stored in the cache memory;

detection circuitry to detect, for at least a set of sub-units of the cache lines stored in the cache memory, whether a number of accesses by the access circuitry to a given sub-unit exceeds a predetermined threshold, in which each sub-unit has a data size that is smaller than the data size of a cache line;

prediction circuitry to generate the prediction, for a given region of a plurality of regions of physical address space, of whether data stored in that region comprises streaming data in which each of one or more portions of the given cache line is predicted to be subject to a maximum of one subsequent read operation or multiple-access data in which each of the one or more portions of the given cache line is predicted to be subject to more than one subsequent read operation, the prediction circuitry being configured to generate the prediction in response to a detection by the detection circuitry of whether the number of accesses to a sub-unit of a cache line having an associated physical address in the given region exceeds the predetermined threshold.

Another example embodiment provides a method comprising:

storing data as a set of cache lines in a cache memory having a first cache portion and second cache portion, the first and second cache portions having different cache line eviction policies; and responsive to a prediction of whether a given cache line to be newly stored in the cache memory comprises streaming data in which each of one or more portions of the given cache line is predicted to be subject to a maximum of one subsequent read operation or multiple-access data in which each of the one or more portions of the given cache line is predicted to be subject to more than one subsequent read operation, storing the given cache line in the first cache portion when the prediction indicates that the given cache line comprises streaming data and storing the given cache line in the second cache portion when the prediction indicates that the given cache line comprises multiple-access data.

FIG. 1*a* schematically illustrates a data processing system 10, such as a system-on-chip (SoC) or network-on-chip (NoC) integrated circuit, including (by way of example) a first processor core 20, a second processor core 30 and a main memory 40 all connected via an interconnect 50. The first processor core 10 and the second processor core 20 each respectively comprise: a level one instruction cache (L1I$) 22, 32; a level one data cache (L1D$) 23, 33; a translation lookaside buffer (TLB) 24, 34 for memory address translation; and access circuitry 25, 35. Not all of these components need be associated with each processor core, but they are all shown in FIG. 1a for completeness.

In order to maintain coherency between the data caches 23, 33 within the first processor core 20 and the second processor core 30, a coherency control unit 80 serves to initiate snoop operations and coherency control utilizing, amongst other circuits, a snoop filter 82. Specifically, coherence between different copies of a data value corresponding to a given memory address within the physical memory address space of the main memory 40 can be managed using coherency mechanisms which operate by executing snoop operations to detect where other or multiple copies of a data item are stored when that data item is to be modified or invalidated, for example in accordance with a protocol such as the so-called MESI protocol. The snoop control unit 80 is also associated with a level two cache (L2$) 84 which is shared by the first processor core 20 and the second processor core 30. In accordance with such techniques, the coherency status of individual cache lines 18 stored within the data cache memory 23, 33, 84 are allocated to the one of modified, exclusive, shared or invalid states. The per cache line coherency status of each of the cache lines is stored within the data cache memories 23, 33, 84.

Data values stored in the main memory 40 can be copied to the level two cache memory 84 and stored as cache lines within the cache memory 84, where each cache line has a given data size and an associated physical address in the main memory 40. Similarly, the cache lines can subsequently be copied from the level two cache memory 84 to the level one cache memory 23, 33, and access circuitry 25, 35 is provided to access the data stored in the cache memory 23, 33 so as to allow the first processor core 20 and the second processor core 30 to read from, or write to, a given cache line. In this way, data values can be transferred between the main memory 40 and the level one cache memory 23, 33 and each cache line stored within the level one cache memory 23, 33 can be accessed by the access circuitry 25, 35. In some examples, the level one cache memory 23, 33 is configured to store data using a cache line data size that is the same as the cache line data size used for storing data within the level two cache memory 84. FIG. 1a therefore provides an example of a data processing system in which data stored in a main memory or higher level memory can be copied to a lower level memory and accessed from the lower level memory by access circuitry.

Figure 1B:
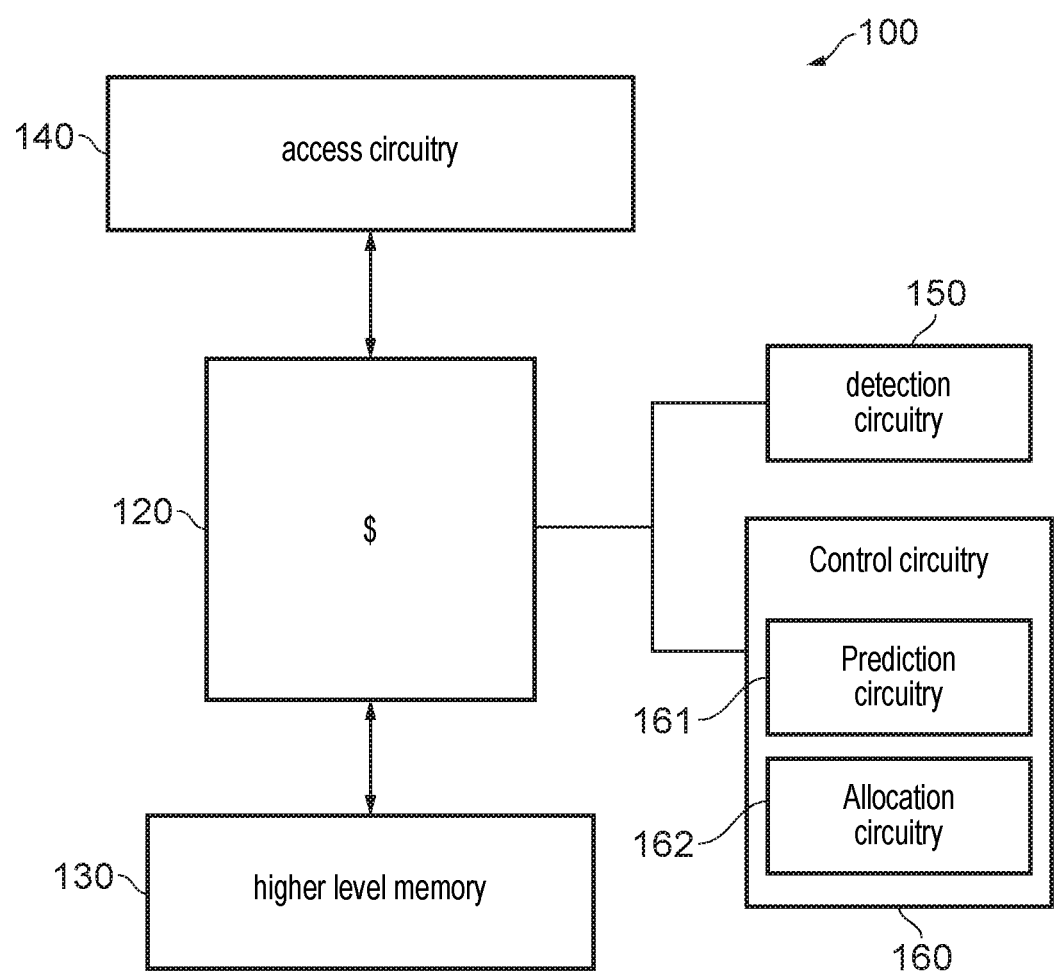
FIG. 1b schematically illustrates a data processing system comprising access circuitry, detection circuitry and control circuitry.

FIG. 1b also schematically illustrates at least a part of a data processing system 100 such as a system-on-chip (SoC) or network-on-chip (NoC) integrated circuit, in order to illustrate the way in which data may be handled using a cache memory.

In FIG. 1b, a generic cache memory 120 is shown, such that the cache memory may store at least a subset of data from a higher level memory 130 and provide access to that data to access circuitry 140. So the cache memory 120 can represent any cache memory in the system of FIG. 1a or in a wider system, such that it lies between a higher level memory 130 and circuitry 140 making use of the relevant data.

The access circuitry 140 could be associated with a processing element, a lower level cache memory or the like. The higher level memory 130 could be a higher level cache, a main memory or the like.

The present techniques are applicable to any cache memory in the system, as shown schematically in FIG. 1b, wherever it appears in a hierarchy of cache memories.

The cache memory 120 is configured to store data as a plurality of cache lines each having a data size and an associated physical address in a main memory. FIG. 1b also shows detection circuitry 150 to detect access by the access circuitry 140 to the cache memory 120 and control circuitry 160 responsive to a detection by the detection circuitry 150.

Data stored in the higher level memory 130, which may for example be a main memory 40 or a level two cache (L2$) 84 illustrated in FIG. 1a, can be copied from the higher level memory 130 to the cache memory 120, which may for example be a level one data cache (L1D$) 23 or a level two cache (L2$) illustrated in FIG. 1a, and access by the access circuitry 140 to the cache lines stored in the cache memory 120 can be detected by the detection circuitry 150. In this way, accesses to the data stored in the cache memory 120 can be detected and in response to the detection the control circuitry 160, which comprises prediction circuitry 161 and allocation circuitry 162, can generate a prediction which can be used to selectively allocate a next cache line to the cache memory 120 in dependence upon a physical address associated with the next cache line.

The cache lines stored by the cache memory 120 each comprise multiple bytes (multiple words of data) and generally have a predetermined size. Example known cache line data lengths are 32, 64 and 128 bytes (though this does not itself limit the nature of the present embodiments), and the cache memory 120 is configured to hold a predetermined number of individual cache lines based on the size of the cache memory. The cache lines each comprise a plurality of sub-units, where a sub-unit may have a size of 8 bits, 16 bits, 24 bits, 32 bits, 40 bits, 48 bits, 56 bits, 64 bits, 72 bits, 80 bits, 88 bits, 96 bits, 104 bits, 112 bits, 120 bits or 128 bits, and the access circuitry 140 can be configured to access respective sub-units from the plurality of sub-units. This means that a given sub-unit (portion) of a cache line may be accessed by the access circuitry 140 without necessarily accessing another sub-unit (another portion) of the cache line. This also means that a cache line containing data categorised as "streaming data" may itself be accessed more than once, even though each sub-unit within that cache line is accessed only once, consistent with the nature of streaming data as discussed above.

Figure 2:
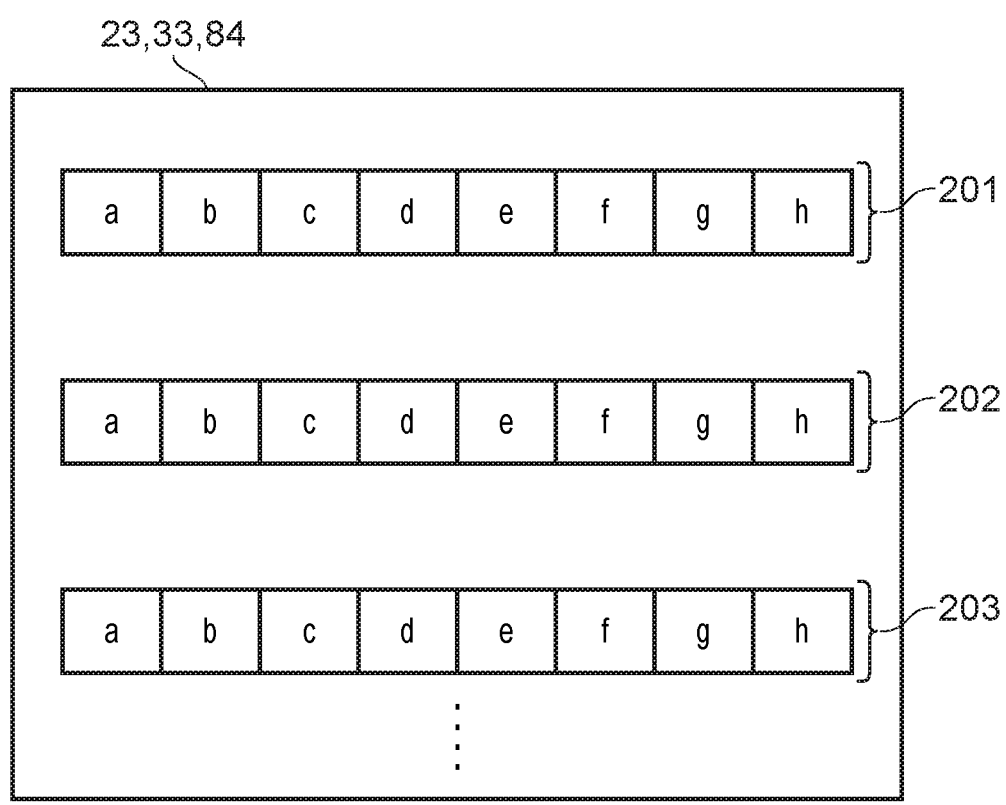
FIG. 2 schematically illustrates a plurality of cache lines each comprising a plurality of sub-units.

FIG. 2 schematically illustrates a plurality of cache lines stored within the cache memory 120 where each cache line comprises a plurality of sub-units 201a-h, 202a-h, 203a-h. In the example shown each individual cache line 201, 202, 203 comprises 8 sub-units, where all of the sub-units have the same data size as one another. For example, the cache lines 201, 202, 203 may each have a data size of 512 bits and each sub-unit may have a data size of 64 bits. Alternatively, each cache line may have a data size of 512 bits and the cache lines may comprise 64 sub-units each having a data size of 8 bits. It will be appreciated that the number of sub-units and the total data size of the cache line may be suitably established as parameters of the cache memory 120 using sub-units having a data size in the range 8 to 128 bits, where a sub-unit has a data size that is smaller than the total data size of the cache line such that the sub-unit corresponds to a portion of the cache line.

Referring again to FIG. 1b, the detection circuitry 150 is provided to detect whether a number of accesses by the access circuitry 140 to a given sub-unit of a cache line stored by the cache memory 120 exceeds a predetermined threshold.

The cache memory 120 is configured to store the plurality of cache lines each comprising a plurality of sub-units and, for at least a set of sub-units of the cache lines stored in the cache memory 23, 33, the detection circuitry 150 is configured to detect whether the access circuitry 140 accesses a given sub-unit in the set of sub-units more than the predetermined threshold number of times. For example, the cache memory 120 may store a total of X individual cache lines and the detection circuitry 150 can be configured to perform the detection for each sub-unit of each cache line stored by the cache memory. Alternatively, the detection circuitry 150 can be configured to perform the detection for a set of the cache lines stored in the cache memory 120, the number of individual cache lines in the set being smaller than the total number of cache lines stored within the cache memory 120. Therefore, at least a set of sub-units of the cache lines stored in the cache memory 120 can be tracked using the detection circuitry 150 to establish whether a sub-unit is accessed by the access circuitry 140 more than the predetermined number of times. In some examples, the detection circuitry 150 is configured to detect a number of respective accesses by the access circuitry 140 to a given-sub unit and to store an indicator for each sub-unit indicative of the number of times the sub-unit has been accessed.

The predetermined threshold can be set to a value of one and the detection circuitry 150 can thus be configured to detect whether a given sub-unit stored in the cache memory 120 is accessed not only a first time but also then subsequently accessed a second time. This detection indicates whether the given sub-unit is accessed more than the predetermined number of times. Therefore, using a sub cache line granularity, the detection circuitry 150 can detect whether a given sub-unit of a cache line is accessed by the access circuitry 140 more than once, and the detection circuitry 150 can therefore detect whether a given sub-unit comprises or holds multiple-access data or single access data.

A cache line comprising multiple-access data is characterised in that at least one sub-unit of the cache line is subject to more than one read operation and is therefore subject to more than one access by the access circuitry subsequent to being written to the cache memory, and as such a detection that a number of accesses by the access circuitry 150 to a given sub-unit stored in the cache memory exceeds the predetermined threshold provides an indication that the given sub-unit comprises multiple-access data.

A cache line comprising streaming data is characterised in that each of the sub-units is subject to no more than one read operation and is therefore accessed no more than once by the access circuitry 140, and as such a detection that a sub-unit is accessed once and subsequently evicted from the cache memory provides an indication that the given sub-unit may comprise streaming data.

Therefore, by using a predetermined threshold having a value of one, a detection that a given sub-unit has been accessed more than the predetermined threshold number of times by the access circuitry 140 provides an indication that the given sub-unit comprises multiple-access data (non-streaming data). A detection that a given sub-unit may comprise streaming data can be made either as (a) the absence of a detection that the given sub-unit comprises multiple-access data, and/or (b) a detection that the given sub-unit is accessed a number of times that is equal to the predetermined threshold and then evicted from the cache memory 120.

In an arrangement (such as that discussed below) in which cache lines from a data region predicted to contain streaming data are subjected to a harsher eviction policy (in that they are more likely to be evicted, and/or likely to be evicted sooner), it can be useful to make a positive prediction of the presence of multiple access data so that any region for which multiple access data are predicted is subject to the less-harsh eviction policy. Data from a region where such a prediction has not been made is subject to the harsher (streaming data) eviction policy.

The detection circuitry 150 is configured to store indicator data for each sub-unit in the set of sub-units, where the indicator data is indicative of at least a first access to a sub-unit, and the detection circuitry 150 is configured to detect a subsequent access to that sub-unit in response to a change in the indicator data stored for that sub-unit.

For example, for a particular sub-unit, when the sub-unit is written to the cache memory 120, indicator data in the form of (for example) a flag data item corresponding to that sub-unit in a table might initially be in an "unset" condition (for example, 0). When a first read access is detected, indicator data which is currently unset can be "set", for example by setting its state to "1". At a second read access, the indicator data is detected as already being set, which may trigger (a) the clearing of the flag data item; (b) a signal to a counter (to be described below) that an individual sub-unit has passed the threshold number of accesses; and (c) optionally the eviction or invalidation of indicator data for that sub-unit and/or that cache line from the table (that is to say, not an eviction of the cached data from the cache, just an eviction or invalidation of the indicator data from the table of tracking information to detect multiple read accesses).

Therefore, each cache line stored within the cache memory 120 comprises a plurality of sub-units and, for at least some of the cache lines stored in the cache memory 120, indicator data can be stored for each sub-unit. The indicator data for a given sub-unit can be updated when the given sub-unit is first accessed by the access circuitry 140, and a subsequent access to the given sub-unit by the access circuitry 140 can be detected by the detection circuitry 150 in response to a change in the indicator data for the given sub-unit. In this way, the detection circuitry 150 can be configured to detect whether a given sub-unit for which indicator data is stored is accessed a second time by the access circuitry 140 based on whether the indicator data indicates that the given sub-unit has already been the subject of one access at the time when a change in the indicator data for the given sub-unit is detected. When storing a new cache line in the cache memory 120 indicator data can be stored for each sub-unit of the newly added cache line. When the cache memory 120 is fully occupied, the addition of a new cache line to the cache memory 120 means that another cache line is evicted from the cache memory 120. In this case, the indicator data for each sub-unit of a cache line can be invalidated in response to a detection that the cache line has been evicted from the cache memory 120, and indicator data is created for each sub-unit of the new cache line stored by the cache memory 120.

For the case where the indicator data is stored for a predetermined number of cache lines that is smaller than the total number of cache lines stored by the cache memory 120, the indicator data can be stored for a given number of stored cache lines currently held in the cache memory. For example, in some cases the indicator data may be stored for the stored cache lines which have been held in the cache memory 120 for a period of time that is less than a predetermined period of time, such that the sub-units of a stored cache line are tracked by the detection circuitry 150 for the predetermined period of time and the indicator data is subsequently invalidated once the stored cache line has been stored for a period of time that is equal to the predetermined period of time, or the indicator data may be stored for stored cache lines held in the cache memory 120 based on whether an age associated with each cache line satisfies a criterion, in which the age is indicative of a period of time since the stored cache line was first stored by the cache memory 120. In one example, the cache memory 120 stores a total of X individual cache lines and indicator data is stored for each sub-unit of N individual cache lines most recently stored by the cache memory 120 (N<X). As such, the storing of a new cache line by the cache memory 120 means that the $N^{th}$ most recently stored cache line becomes the $(N+1)^{th}$ most recently stored cache line, and as such the detection circuitry 150 may invalidate the indicator data for each sub-unit of this cache line to stop tracking the sub-units of the $(N+1)^{th}$ most recently stored cache line.

As illustrated in FIG. 3, the stored indicator data may, for example, be represented by a cache access tracking table. Indicator data can be stored for each sub-unit of each cache line, so that a number of accesses by the access circuitry 150 can be stored for each sub-unit. Therefore, the cache access tracking table comprises a row, as drawn for illustrative purposes, for each cache line stored by the cache memory 120 or at least a given number of stored cache lines held in the cache memory, and each row comprises an entry for each individual sub-unit (in this example the cache lines each comprise a plurality of sub-units ranging from sub-unit a to sub-unit x) making up that cache line, where each entry indicates a number of times the access circuitry 150 has accessed each individual sub-unit of the cache line. The correspondence between sub-unit and table entry may be implied by the order of the entries in the row of FIG. 3 corresponding to the order of sub-units within a cache line. An age (a period of time since a cache line was first stored by the cache memory) may optionally be stored for the indicator data associated with each cache line. A TAG value may be associated with each cache line, which is indicative of a physical address in the memory associated with each cache line. Therefore, using the TAG value for a given cache line it is possible to determine a region of the physical address space in the memory that is associated with the given cache line based on whether the TAG value corresponds to a physical address that is within a range of physical addresses corresponding to a given region of the physical address space.

As mentioned above the detection circuitry 150 can be configured to invalidate the stored indicator data for a given sub-unit in response to one or more from the list consisting of: a detection that the number of accesses by the access circuitry 140 to the given sub-unit exceeds the predetermined threshold; and a detection that the cache line comprising the given sub-unit has been evicted from the cache memory 120. Therefore, upon storing a new cache line in the cache memory 120, indicator data can be stored for each sub-unit of the cache line to track a number of accesses to each sub-unit, and the indicator data for a sub-unit can be invalidated in response to a detection that the number of accesses by the access circuitry 140 to the given sub-unit exceeds the predetermined threshold. When there is a detection that the number of accesses to the given sub-unit exceeds the predetermined threshold this can indicate that the sub-unit has been identified as comprising multiple-access data and the indicator data for the sub-unit can therefore be invalidated to stop tracking accesses to the sub-unit, as in this example there is nothing further to be gained by continuing to track accesses to that sub-unit.

In some examples, the indicator data for all sub-units of that cache line can be invalidated at the same time; however, in other examples the detection circuitry 150 continues to store the indicator data for the other sub-units of the cache line and will invalidate the indicator data for any of the other sub-units of the cache line according to a detection of whether the number of accesses exceeds the predetermined threshold. When eviction of the cache line from the cache memory 120 is detected by the detection circuitry 150, the detection circuitry 150 is configured to invalidate the indicator data stored for each sub-unit of the evicted cache line to stop performing detection for the cache line.

Referring again to FIG. 1b, the higher level memory 130 may be a main memory (such as the main memory 40 illustrated in FIG. 1a) which supports memory locations which each have a physical address, and the physical addresses of the higher level memory 130 can be attributed to one region of a plurality of regions of the physical address space. In other words, each physical address of the higher level memory 130 can be specified as belonging to one region of a plurality of regions forming the higher level memory 130. For example, a memory page size of 4 KB may be used to transfer data values between the higher level memory 130 and the cache memory 120, and a first region of the physical address space of the higher level memory 130 may comprise the memory locations referenced using a first memory page and a second region of the physical address space of the higher level memory 130 may comprise the memory locations referenced using a second memory page. As such, the higher level memory 130 can be considered as a plurality of regions, where a first range of physical addresses correspond to one region of the physical address space and a second range of physical addresses correspond to another region of the physical address space, and each region of the physical address space has a total data size that is larger than the data size of one cache line stored by the lower level cache memory 120. Alternatively, the higher level memory 130 may be a higher level cache memory (such as the level two cache (L2$) 84 illustrated in FIG. 1a) which stores a plurality of cache lines each having an associated physical address in a main memory (such as the main memory 40), and each cache line stored in the higher level memory 130 can be attributed to one region of the plurality of regions of the physical address space of the main memory.

The prediction circuitry 161 is provided to generate a prediction for at least one region of physical address space of a main memory in response to a detection by the detection circuitry 150 of whether the number of accesses by the access circuitry 140 to a sub-unit of a cache line stored in the cache memory 120 having an associated physical address in the given region exceeds the predetermined threshold. Using the detection by the detection circuitry 150 the prediction circuitry 161 can count the number of sub-units associated with a given region for which the number of accesses by the access circuitry 140 exceeds the predetermined threshold, and a prediction can be generated for a region of physical address space based on the number of sub-units counted by the prediction circuitry 161.

The allocation circuitry 162 is provided to selectively allocate a next cache line to the cache memory 120 in dependence upon the prediction applicable to the region of physical address space containing that next cache line. For a request to store a next cache line, the allocation circuitry 162 can use the prediction generated by the prediction circuitry 161 for the region of physical address space corresponding to the next cache line to selectively allocate the next cache line to the cache memory 120 so that a next cache line predicted to comprise streaming data can potentially be allocated to the cache memory 120 differently (or for example, not at all) with respect to a next cache line predicted to comprise multiple access data. Therefore, the cache lines can be selectively allocated to the cache memory 120 according to a prediction of whether the cache line comprises streaming data or non-streaming data (multiple-access data) so that cache lines can be stored in the cache memory 120 in a manner that is appropriate with a number of times that the cache line is predicted to be accessed by the access circuitry 140.

The apparatus of FIG. 1*b* therefore provides an example of an apparatus comprising: a cache memory 120 to store data as a plurality of cache lines each having a data size and an associated physical address in a memory; access circuitry 140 to access the data stored in the cache memory 120; detection circuitry 150 to detect, for at least a set of sub-units of the cache lines stored in the cache memory 120, whether a number of accesses by the access circuitry 140 to a given sub-unit exceeds a predetermined threshold, in which each sub-unit has a data size that is smaller than the data size of a cache line; prediction circuitry 161 to generate a prediction, for a given region of a plurality of regions of physical address space, of whether data stored in that region comprises streaming data in which each of one or more portions of the given cache line is predicted to be subject to a maximum of one read operation or multiple-access data in which each of the one or more portions of the given cache line is predicted to be subject to more than one read operation, the prediction circuitry 161 being configured to generate the prediction in response to a detection by the detection circuitry 150 of whether the number of accesses to a sub-unit of a cache line having an associated physical address in the given region exceeds the predetermined threshold; and allocation circuitry 162 to selectively allocate a next cache line to the cache memory in dependence upon the prediction applicable to the region of physical address space containing that next cache line.

Prediction Generation

The prediction circuitry 161 is configured to store count data for at least the given region of the physical address space in the memory, the count data indicative of a number of sub-units having an associated physical address in the given region for which the number of accesses by the access circuitry 140 exceeds the predetermined threshold. Therefore, based on a total number of sub-units indicated by the count data to comprise data detected as being multiple-access data, the prediction circuitry 161 can generate a prediction for the region of the physical address space in the memory of whether the data stored in that region comprises streaming data or multiple-access data.

Figure 4:
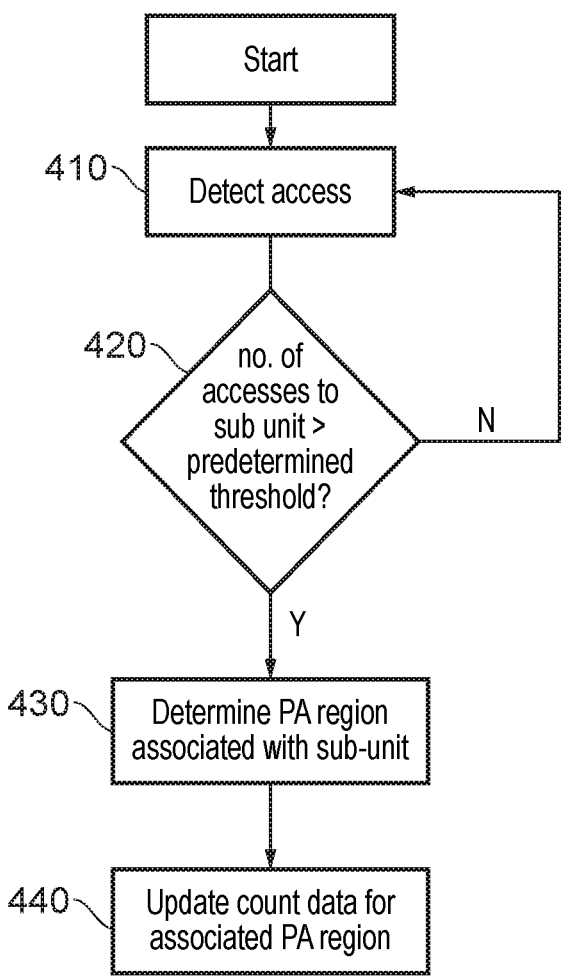
FIG. 4 is a schematic flow chart illustrating one method of updating count data.

The count data for the region of the physical address space can be updated in a number of different ways based on the indicator data for each sub-unit associated with the given region. FIG. 4 is a schematic flow chart illustrating a method of updating the count data for a region of the physical address space in the memory. At a step 410 the detection circuitry detects accesses to a sub-unit in response to the indicator data stored for each sub-unit of a set of sub-units of the cache lines stored by the cache memory. At a step 420, the detection circuitry detects whether a number of accesses by the access circuitry to a given sub-unit of the set of sub-units for which the indicator data is stored exceeds a predetermined threshold. When the stored indicator data indicates that none of the sub-units have been accessed more than the predetermined threshold number of times, the process returns to the step 410. In response to a first detection by the detection circuitry that the predetermined threshold is exceeded for a given sub-unit the process proceeds to a step 430. At the step 430 the prediction circuitry determines which region of the physical address space in the memory is associated with the sub-unit based on a matching of the physical address of the sub-unit with the range of physical addresses corresponding to the region of the physical address space. At a step 440 the prediction circuitry updates the count data for the region of physical address space associated with the sub-unit to indicate a greater number of sub-units (for example, by incrementing the count data). As such, the prediction circuitry stores count data which can be updated to provide an indication of a number of sub-units for which the detection circuitry has detected multiple-accesses by the access circuitry when the predetermined threshold is set to one, and therefore using the count data the prediction circuitry can predict a likelihood of whether a region of physical address space stores data comprising multiple-access data or streaming data. Therefore FIG. 4 provides an example of updating count data stored for a region of physical address space to indicate a greater number of sub-units in response to a first detection that a number of accesses by the access circuitry to a given sub-unit having an associated physical address in the given region exceeds the predetermined threshold. In accordance with the number of sub units indicated by the count data as having been accessed multiple times, the prediction circuitry can generate a prediction of whether streaming data is stored by the region.

Figure 5:
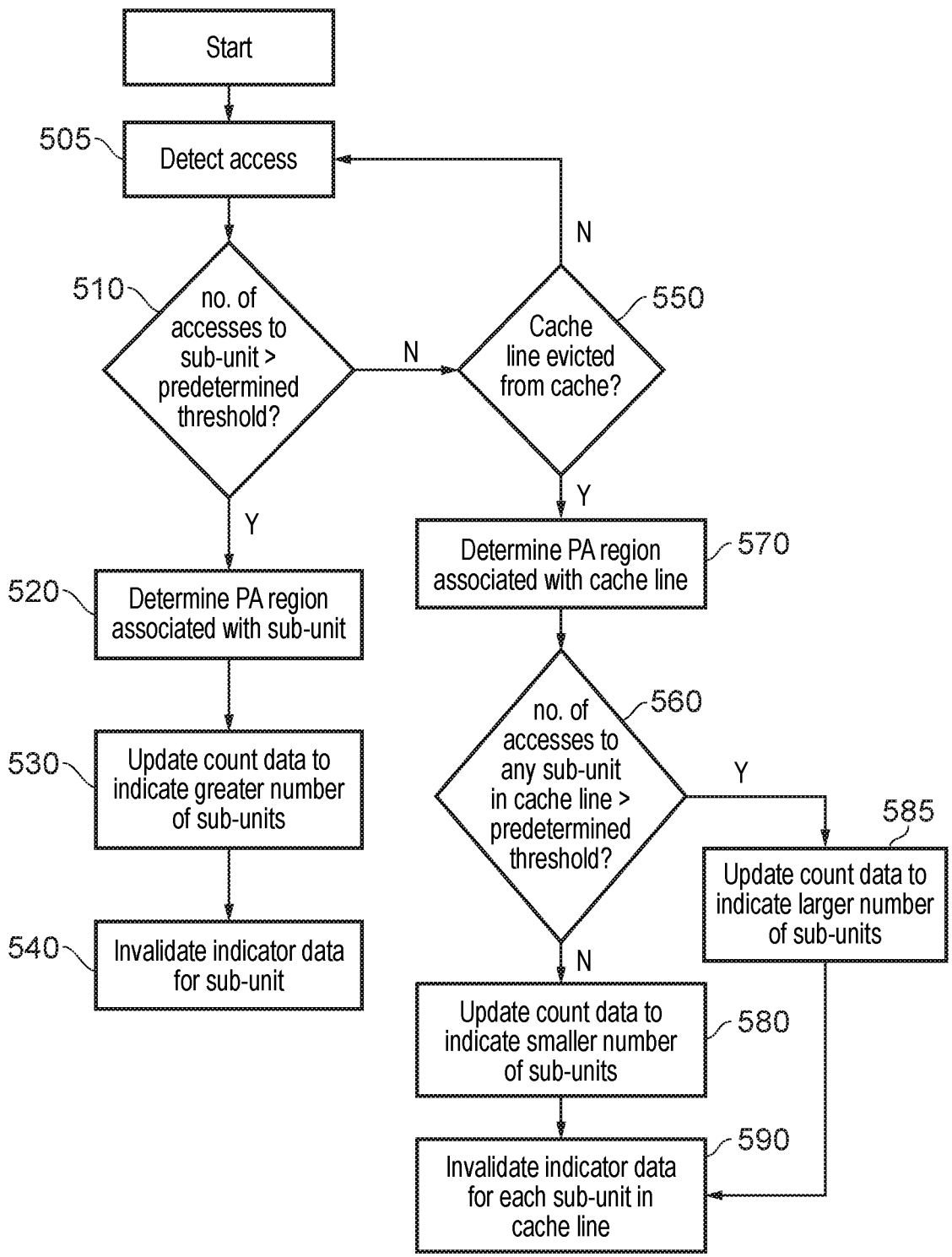
FIG. 5 is a schematic flow chart illustrating one method of updating count data.

FIG. 5 is a schematic flow chart illustrating another method of updating the count data for a region of the physical address space in the memory. In some examples, in addition to updating the count data for a given region to indicate a greater number of sub-units, the prediction circuitry can also update the count data for the given region to indicate a smaller number of sub-units in response to the detection circuitry. At a step 505, accesses to a sub-unit are detected by the detection circuitry on the basis of the indicator data stored for each sub-unit of a set of sub-units of the cache lines stored by the cache memory. At a step 510, the detection circuitry detects whether a number of accesses by the access circuitry to a given sub-unit of the set of sub-units for which the indicator data is stored exceeds the predetermined threshold. Provided that the indicator data for one of the sub-units indicates that the sub-unit has been accessed more than the predetermined threshold number of times, the process will proceed to a step 520. At the step 520 the prediction circuitry determines, based on physical address matching, which region of the physical address space in the memory is associated with the sub-unit. At a step 530 the prediction circuitry updates the count data for the region of physical address space associated with the sub-unit to indicate a greater number of sub-units. At a step 540 the detection circuitry invalidates the indicator data stored for the sub-unit, as the sub-unit has been detected as comprising multiple-access data and the count data has been updated accordingly. Therefore, the indicator data for the sub-unit is invalidated at the step 540 in response to the detection at the step 510 that the number of accesses by the access circuitry to the sub-unit exceeds the predetermined threshold, and the count data for the region is updated at the step 530 to indicate a greater number of sub-units detected as comprising multiple-access data.

At the step 510, when none of the sub-units of the set of sub-units tracked by the detection circuitry have been accessed more than the predetermined number of times, the process proceeds to a step 550. At the step 550 the detection circuitry detects whether indicator data is currently stored for a sub-unit of a cache line that has been evicted from the cache memory. When it is detected that indicator data is currently stored for a sub-unit for which the cache line has been evicted (which is to say that the evicted cache line is one which is currently tracked by the tracking table), the process proceeds to a step 570 (if the evicted cache line is not currently tracked by the tracking table, no action is taken here).

At the step 570, the prediction circuitry determines, based on physical address matching, which region of the physical address space in the memory is associated with the evicted cache line. Then at a step 560 a determination is made of whether any of the sub-units of the evicted cache line have been accessed more than the predetermined threshold number of times. When none of the sub-units of the evicted cache line are detected as having been accessed more than the predetermined threshold number of times (i.e. in the case where the predetermined threshold is set to one, all of the sub-units of the evicted cache line have each been accessed no more than once) the process proceeds to a step 580. At a step 580, the prediction circuitry updates the count data for the region of physical address space associated with the sub-unit to indicate a smaller number of sub-units. At a step 590 the detection circuitry invalidates the indicator data stored for the sub-unit, as the sub-unit has been detected as comprising streaming data and the count data has been updated accordingly to reflect this detection.

Turning to the "yes" outcome of the step 560, when one or more of the sub-units of the evicted cache line are detected as having been accessed more than the predetermined threshold number of times (i.e. in the case where the predetermined threshold is set to one, one or more of the sub-units of the evicted cache line have each been accessed more than once) the process proceeds to a step 585, at which the prediction circuitry updates the count data for the region of physical address space associated with the sub-unit to indicate a larger number of sub-units. Control then passes to the step 590 discussed above.

At the step 560, when it is determined that at least one of the sub-units of the evicted cache line has been accessed more than the predetermined threshold number of times, the process proceeds directly to the step 590 so that the indicator data stored for each sub-unit of the evicted cache line is invalidated without updating the count data. Therefore, the indicator data for the sub-units of the evicted cache line is invalidated at the step 590 in response to the detection at the step 550 that the cache line has been evicted from the cache memory and, in dependence upon whether any of the sub-units of the evicted cache line have been accessed more than the predetermined threshold number of time, the count data is either updated at the step 580 or not updated.

Therefore, for the case where the predetermined threshold has a value of one, at the step 530 the count data is updated once in response to a detection that a given sub-unit is accessed more than once to indicate a greater number of sub-units, whereas at the step 580 the count data is updated once in response to a detection that a cache line comprising only sub-units that have been accessed no more than once has been evicted to indicate a smaller number of sub-units. In this way, when the predetermined threshold is set to one, the count data can be updated to indicate a greater number of sub-units in response to a detection of a sub-unit comprising multiple-access data and the count data can also be updated to indicate a smaller number of sub-units in response to a detection of eviction of a cache line comprising no sub-units accessed more than once. A cache line comprising streaming data is typically characterised in that each sub-unit of the cache line will be subject to just one read operation and the sub-units will typically be read in a sequential manner. Therefore, when a cache line is evicted from the cache memory and none of the constituent sub-units have been accessed more than once, this can provide an indication that the cache line comprises streaming data and a detection of an eviction of such a cache line can be used to update the count data to reflect this.

In some examples, the weighting of the respective updates at the step 530 and the step 580 may be equal. For example, an update to the count data at the step 530 may increment a counter value by one and similarly an update to the count data at the step 580 may decrement the counter value by one, such that the respective updates have equal weighting. Alternatively, the weighting of the respective updates at the step 530 and the step 580 may be different. At the step 530 the count data may be updated by incrementing the counter value with a first weighting or an increment amount, and at the step 580 the count data may be updated by decrementing the counter value with a second weighting or a decrement amount, in which the first weighting is different to the second weighting. The first weighting may have a fixed weighting value such that the count data is updated to increment the counter value by a fixed amount (e.g. 1) for each sub-unit, whereas the second weighting may have a variable weighting value that varies in dependence on the number of sub-units in the evicted cache line which have been accessed once. For example, in response to detecting an eviction of a cache line in which no sub-units have been accessed, the count data can be updated at the step 580 according to the second weighting to decrement the counter value by a first amount (e.g. 1). Similarly, in response to detecting an eviction of a cache line in which one of the sub-units has been accessed once and the other sub-units have not been accessed, the count data can be updated at the step 580 to decrement the counter value by a second amount (e.g. 2). As such, the magnitude of the variable weighting value used for the second weighting may be selected so that the second weighting is proportional to the number of sub-units in the evicted cache line which have been accessed once, where a minimum value for the variable weighting value is used when none of the sub-units have been accessed and a maximum value for the variable weighting value is used when all of the sub-units have been accessed once.

Using the count data stored for a given region of the physical address space, the prediction circuitry can generate a prediction for the given region of whether data stored in that region comprises streaming data or multiple access data. The count data for the given region is updated in response to a first detection that a number of accesses by the access circuitry to a given sub-unit having an associated physical address in the given region exceeds the predetermined threshold, and therefore the count data provides an indication of a number of sub-units associated with the given region which have been detected by the detection circuitry to comprise multiple access data. Therefore, as illustrated in FIG. 4, the count data can be updated to indicate a greater number of sub-units, for example by incrementing the counter value in response to a detection that a sub-unit comprises multiple-access data, and the counter value can be compared with a prediction threshold. In this way, the prediction circuitry can generate a prediction for the given region of the physical address space indicating that the data stored in the given region comprises either multiple access data or streaming data in dependence upon a comparison of the counter value with the prediction threshold.

At the start of the process illustrated in FIG. 4 when no prediction has yet been generated for the region of the physical address space, the prediction circuitry is configured to assign a default prediction to the region indicating that the data in the region is predicted to comprise multiple-access data. As such, for the case where there is no prediction for the region, a next cache line corresponding to the region can be allocated to the cache memory in accordance with a default prediction applicable to the region indicating that the region is predicted, by default, to comprise multiple-access data. The prediction circuitry can update the count data for a given region in response to a detection that the number of accesses to a given sub-unit exceeds the predetermined threshold, and a prediction of whether the region comprises streaming data or multiple-access data can be generated based on whether a number of sub-units indicated by the count data exceeds a threshold number of sub-units indicated by the prediction threshold. When the count data is updated and the number of sub-units indicated by the count data does not exceed the prediction threshold, the prediction circuitry is configured to continue to assign the default prediction to the region indicating that the region is predicted to comprise multiple-access data. In response to an update to the count data that causes the number of sub-units indicated by the count data to exceed the prediction threshold, the prediction circuitry is configured to generate a prediction for the region of the physical address space to indicate that the data stored in the region is predicted to comprise multiple-access data. In this way, the prediction can be generated to indicate that the region is predicted to comprise multiple-access data when the number of sub-units detected to comprise multiple-access data exceeds the prediction threshold.

However, when a prediction has not been generated by the prediction circuitry for the region of the physical address space after a predetermined period of time to indicate that the data stored in the region is predicted to comprise multiple-access data, the prediction circuitry is configured to generate a prediction for the region of the physical address space to indicate that the data stored in the region is predicted to comprise streaming data. In other words, in the absence of a prediction that the region comprises multiple-access data after a predetermined period of time, the prediction circuitry is configured to generate a prediction for the region to indicate that the data stored in the region is predicted to comprise streaming data. However, the prediction circuitry is configured to continue to update the count data for the region in response to a detection that a number of accesses to a given sub-unit exceeds the predetermined threshold, and in the case where an update to the count data causes the number of sub-units indicated by the count data to subsequently exceed the prediction threshold the prediction can be generated by the prediction circuitry to indicate that the region is now predicted to comprise multiple-access data.

In some examples, the prediction threshold may be a threshold specifying a number of sub-units detected to comprise multiple-access data, as discussed above. It will be appreciated that the number of sub-units indicated by the prediction threshold may vary in dependence upon the number of sub-units forming a single cache line. For example, for a larger number of sub-units per cache line (greater cache line granularity) a greater value may be used for the number of sub-units indicated by the prediction threshold, whereas for a smaller number of sub-units per cache line a smaller value may be used for the number of sub-units indicated by the prediction threshold. When using such a prediction threshold, the prediction circuitry is configured to reset the count data for each region predicted to comprise multiple-access data after a given period of time. Therefore, for a region for which the count data exceeds the prediction threshold, the count data can be reset after the given period of time such that the number of sub-units indicated by the count data is set to a default value that is less than the number of sub-units indicated by the prediction threshold. When the count data is reset and the number of sub-units indicated by the count data does not exceed the prediction threshold, the prediction circuitry can assign the default prediction to the region indicating that the data in the region is predicted to comprise multiple-access data. As such, the prediction circuitry can generate a prediction for the region of the physical address space to indicate that the data stored in the region is predicted to comprise multiple-access data in response to an update to the count data that causes the number of sub-units indicated by the count data to exceed the prediction threshold, as discussed previously.

For a region of the physical address space for which the generated prediction indicates that data stored in the region is predicted to comprise streaming data, the count data is not reset unless there is a subsequent update to the count data which causes the number of sub-units indicated by the count data to subsequently exceed the prediction threshold such that a prediction is generated for the region indicating that the region is predicted to comprise multiple-access data. In this way, a region for which the prediction generated by the prediction circuitry indicates that the data in the region is predicted to comprise streaming data will have count data that is not reset, and therefore the prediction for the region will continue to indicate that the data in the region is predicted to comprise streaming data without the count data being reset.

In some examples, the count data can be updated in accordance with the process illustrated in FIG. 5 so that the count data can be updated to indicate a greater number of sub-units in response to a detection that a sub-unit comprises multiple-access data and the count data can also be updated to indicate a smaller number of sub-units in response to a detection that a cache line has been evicted from the cache memory when none of the sub-units of the evicted cache line are detected as having been accessed more than the predetermined threshold number of times. In this case, the prediction circuitry can update the count data in order to increment and decrement the number of sub-units indicated by the count data. Therefore, the count data can be updated by the prediction circuitry to vary the number of sub-units indicated by the count data and a prediction of whether the region comprises streaming data or multiple-access data can be generated based on whether a number of sub-units indicated by the count data exceeds a threshold number of sub-units indicated by the prediction threshold, as discussed previously. However, unlike the process illustrated in FIG. 4, the process illustrated in FIG. 5 allows the count data to be updated to decrement the number of sub-units indicated by the count data, and therefore in some examples the prediction threshold may be used in accordance with the process illustrated in FIG. 5 without resetting the count data for each region predicted to comprise multiple-access data after a given period of time. This is because the number of sub-units indicated by the count data can be dynamically adjusted in response to detections by the detection circuitry, so that a prediction may initially be generated for the region indicating that the data in the region is predicted to comprise multiple access data, and changes in the count data may be such that a subsequent prediction is generated for the region indicating that the region is subsequently predicted to comprise streaming data when the number of sub-units indicated by the count data does not exceed the threshold number of sub-units indicated by the prediction threshold.

However, in other examples the prediction threshold may be used in accordance with the process illustrated in FIG. 5 and the prediction circuitry can be configured to reset the count data for each region predicted to comprise multiple-access data after a period of time. The reset functionality may be used in this case so as to prevent a situation arising where the number of sub-units indicated by the count data becomes excessively large with respect to the prediction threshold. For example, if the number of sub-units indicated by the count data is more than two times the number of sub-units indicated by the prediction threshold, the prediction generated for the region indicates that the data in the region comprises multiple-access data even when a significant number of the most recent updates to the count data resulted in decrementing the number of sub-units.

Figure 6:
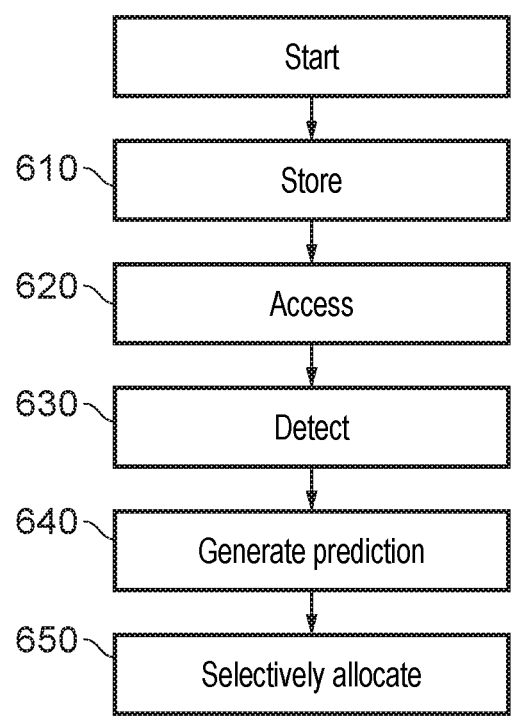
FIG. 6 is a schematic flow chart illustrating a method.

FIG. 6 is a schematic flow chart illustrating a method comprising:

storing (at a step 610), in a cache memory, data as a plurality of cache lines each having a data size and an associated physical address in a memory;

accessing (at a step 620) the data stored in the cache memory;

detecting (at a step 630), for at least a set of sub-units of the cache lines stored in the cache memory, whether a number of accesses to a given sub-unit exceeds a predetermined threshold, in which each sub-unit has a data size that is smaller than the data size of a cache line;

generating a prediction (at a step 640), for a given region of a plurality of regions of physical address space, of whether data stored in that region comprises streaming data in which each of one or more portions of the given cache line is predicted to be subject to a maximum of one subsequent read operation or multiple-access data in which each of the one or more portions of the given cache line is predicted to be subject to more than one subsequent read operation, in which the prediction is generated in response to a detection of whether the number of accesses to a sub-unit of a cache line having an associated physical address in the given region exceeds the predetermined threshold; and selectively allocating (at a step 650) a next cache line to the cache memory in dependence upon the prediction applicable to the region of physical address space containing that next cache line.

Prediction Based Cache Line Store

Figure 7A:
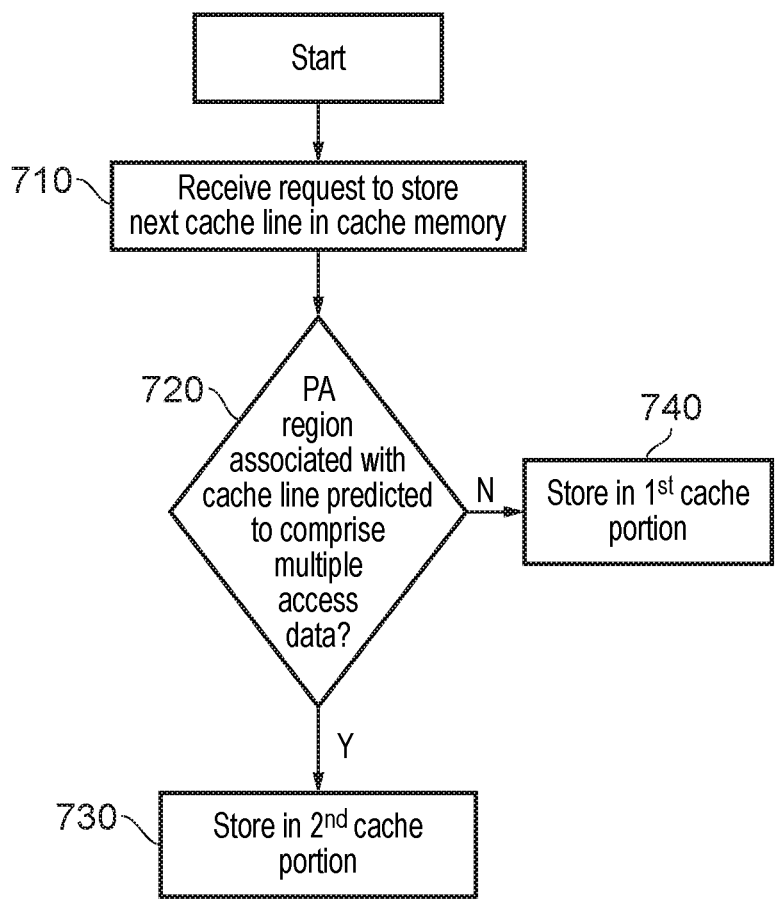
FIG. 7a is a schematic flow chart illustrating a method of storing a cache line in a cache memory having a first cache portion and second cache portion.

FIG. 7a is a schematic flow chart illustrating a method of storing a cache line in a cache memory having a first cache portion and second cache portion, the first and second cache portions having different cache line eviction policies. At a step 710 a request to store a next cache line in the cache memory is received. At a step 720 a prediction generated according to the techniques mentioned above is used. At the step 720 the prediction generated for the region of the physical address (PA) space in the memory which is associated with the next cache line is used and depending on the prediction the process proceeds to a step 730 or a step 740. When it is predicted that the region of the physical address space comprises multiple-access data, the process proceeds to the step 730, and at the step 730 the cache line is stored by the cache memory in a second cache portion of the cache memory. When the region of the physical address space is predicted to comprise data that is not multiple-access data, the process proceeds to the step 740, and at the step 740 the cache line is stored by the cache memory in a first cache portion of the cache memory. In this way, a next cache line to be stored by the cache memory can be selectively allocated to the cache memory in dependence upon the prediction application to the region of physical address space containing that next cache line, so that a next cache line predicted to comprise multiple-access data is stored in a different cache portion of the cache memory to a next cache line predicted to comprise streaming data.

Figure 7B:
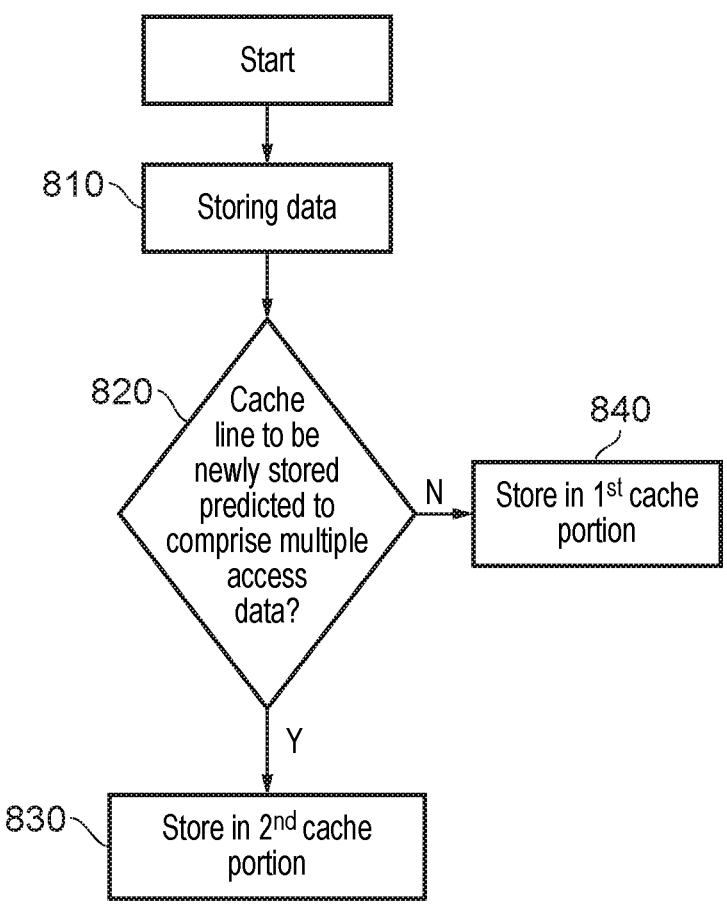
FIG. 7b is a schematic flow chart illustrating another method of storing a cache line in a cache memory having a first cache portion and second cache portion.

FIG. 7b is a schematic flow chart illustrating another method of storing a cache line in a cache memory having a first cache portion and second cache portion, the first and second cache portions having different cache line eviction policies. There is provided a method comprising: storing (at a step 810) data as a set of cache lines in a cache memory having a first cache portion and second cache portion, the first and second cache portions having different cache line eviction policies; and responsive to a prediction of whether a given cache line to be newly stored in the cache memory comprises streaming data in which each of one or more portions of the given cache line is predicted to be subject to a maximum of one subsequent read operation or multiple access data in which each of the one or more portions of the given cache line is predicted to be subject to more than one subsequent read operation (at a step 820), storing (at a step 840) the given cache line in the first cache portion when the prediction indicates that the given cache line comprises streaming data and storing (at a step 830) the given cache line in the second cache portion when the prediction indicates that the given cache line comprises multiple-access data.

Note that instead of using physically separate first and second cache portions, the data could be stored to a common cache (in the manner discussed with reference to FIG. 10 below) but with a flag associated with a data item or cache line indicating a prediction of "streaming" or "non-streaming" data, which can then be used as part of different respective eviction policies.

Figure 8:
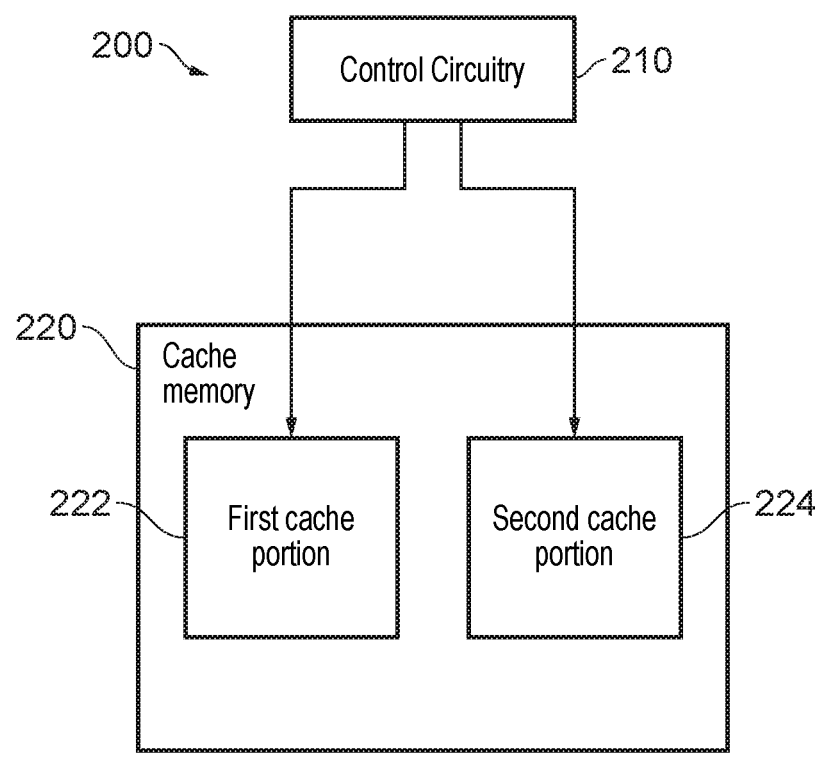
FIG. 8 schematically illustrates circuitry including control circuitry, and a cache memory having a first cache portion and a second cache portion.

FIG. 8 schematically illustrates circuitry 200, such as a system-on-chip (SoC) or network-on-chip (NoC) integrated circuit, including control circuitry 210, and a cache memory 220 having a first cache portion 222 and a second cache portion 224. The cache memory 220 stores data as a plurality of cache lines each having a data size and an associated physical address in a memory. Stored cache lines are evicted from the cache memory according to a cache line eviction policy, where stored cache lines in the first cache portion are evicted according to a first cache line eviction policy and cache lines stored in the second cache portion are evicted according to a second cache line eviction policy. The control circuitry 210 is configured, responsive to a prediction, generated based on the techniques mentioned above, of whether a given cache line to be newly stored in the cache memory comprises streaming data in which each of one or more portions of the given cache line is predicted to be subject to a maximum of one subsequent read operation or multiple-access data in which each of the one or more portions of the given cache line is predicted to be subject to more than one subsequent read operation, to store the given cache line in the first cache portion when the prediction indicates that the given cache line comprises streaming data and to store the given cache line in the second cache portion when the prediction indicates that the given cache line comprises multiple-access data. Therefore, the circuitry 200 can allow a next cache line to be stored by the cache memory in either the first cache portion or the second cache portion based on the prediction of the type of data (i.e. streaming data or multiple access data) included in the next cache line, and the respective cache portions operate using different cache line eviction policies. As such, a next cache line predicted to comprise streaming data can be stored by the cache memory in the first cache portion and when the first cache portion is fully occupied a stored cache line can be evicted from the first cache portion based on the first cache line eviction policy. Similarly, a next cache line predicted to comprise multiple-access data can be stored by the cache memory in the second cache portion and when the second cache portion is fully occupied a stored cache line can be evicted from the second cache portion based on the second cache line eviction policy. FIG. 8 therefore provides an example of circuitry configured to perform the method illustrated in either FIG. 7a or FIG. 7b.

As discussed previously, the first cache portion and the second cache portion operate using different cache line eviction policies. In response to a detection that the first cache portion is fully occupied when a next cache line is to be newly stored in the first cache portion, the control circuitry 210 is configured to evict an earliest-stored cache line from the first cache portion. As such, the control circuitry 210 can be configured to store data predicted to comprise streaming data in the first cache portion and when it is detected that the first cache portion is fully occupied an oldest stored cache line in the first cache portion can be evicted to allow the new cache line to be stored. Whereas the first cache portion uses an age-based eviction policy, the second cache portion uses another eviction policy such as a least-recently-used (LRU) eviction policy in order to select a cache line for eviction.

The first cache portion 222 and the second cache portion 224 may each comprise a respective memory region, in which the memory region of the first cache portion holds a smaller number of cache lines than the memory region of the second cache portion. As such, a first portion of the cache memory 220 may be used only as the first cache portion and a second portion of the cache memory 220 may be used only as the second cache portion. The memory region of the first cache portion is capable of storing a plurality of cache lines each predicted to comprise streaming data and the memory region of the second cache portion is capable of storing a plurality of cache lines each predicted to comprise multiple-access data. In this way, the memory region of the second cache portion can be used solely for storing cache lines predicted to comprise multiple access data and the memory region of the first cache portion can be used solely for storing cache lines predicted to comprise streaming data, thereby preventing the second cache portion from being polluted. The size of the memory region of the first cache portion is smaller than the size of the memory region of the second cache portion. Since the cache lines stored by the memory region of the second cache portion are predicted to be accessed multiple times, a larger memory size is useful to ensure that cache lines can be stored and accessed multiple times prior to being evicted. On the other hand, since the cache lines stored by the memory region of the first cache portion are predicted to be accessed only once and then evicted, a smaller memory size can be utilised for the first cache portion because once a cache line has been accessed, subsequent access to the cache line will not be required and therefore there is no requirement to continue to store the cache line. In some examples, the first cache portion comprises a buffer memory separate to the second cache portion.

As discussed previously, the first cache portion and the second cache portion operate using different cache line eviction policies. In response to a detection that the first cache portion is fully occupied when a next cache line is to be newly stored in the first cache portion, the control circuitry 110 is configured to evict an earliest-stored cache line from the first cache portion. As such, the control circuitry 110 can be configured to store data predicted to comprise streaming data in the first cache portion and when it is detected that the first cache portion is fully occupied an oldest stored cache line in the first cache portion can be evicted to allow the new cache line to be stored. Whereas the first cache portion uses an age-based eviction policy, the second cache portion uses (for example) a round robin eviction policy.

Figure 9:
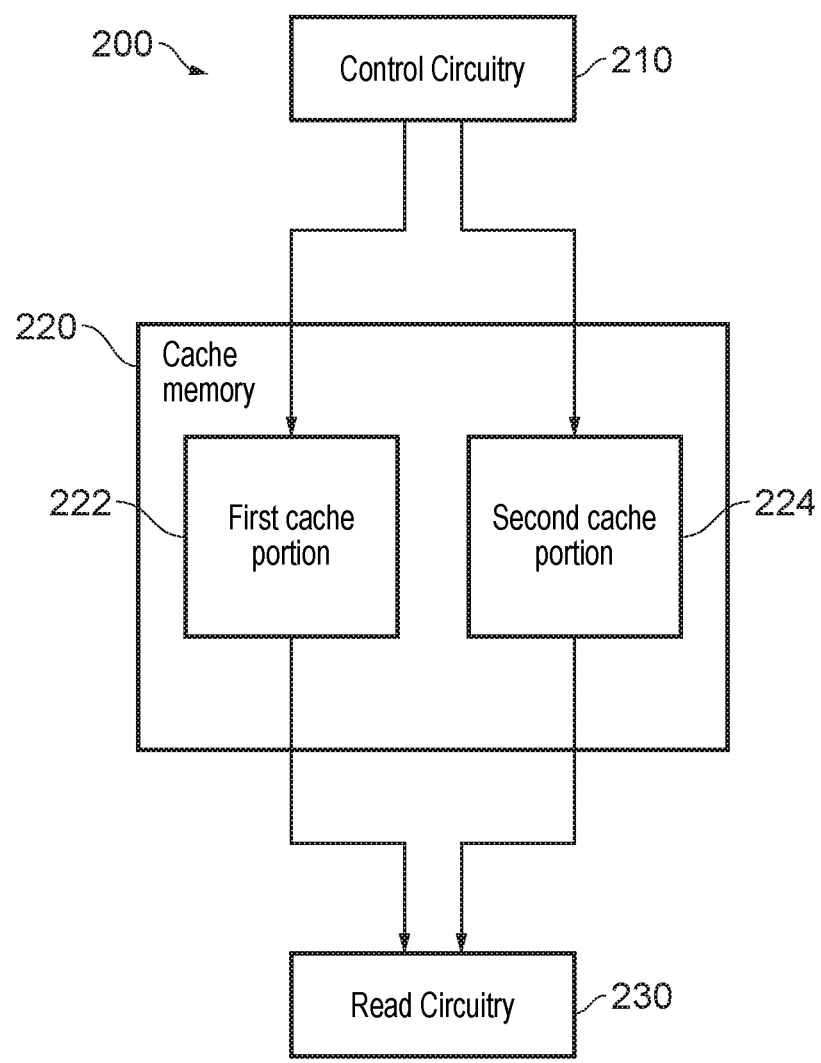
FIG. 9 schematically illustrates circuitry comprising read circuitry 130.

FIG. 9 schematically illustrates the circuitry 200 comprising read circuitry 120. The read circuitry 230 is configured to retrieve a required cache line from the cache memory 220, the read circuitry 230 being configured to detect whether the required cache line is stored in either the first cache portion 222 or the second cache portion 224. The control circuitry 210 can be configured to store a given cache line in either the first cache portion 222 or the second cache portion 224, and when a specific cache line is required to be read the read circuitry 230 can detect which of the cache portions 222, 224 is used to store the required cache line and subsequently retrieve the cache line. As such, a data access operation can be performed by the read circuitry and a cache line can be retrieved from either cache portion by multiplexing the data from the memory region of the first cache portion or the memory region of the second cache portion.

Figure 10:
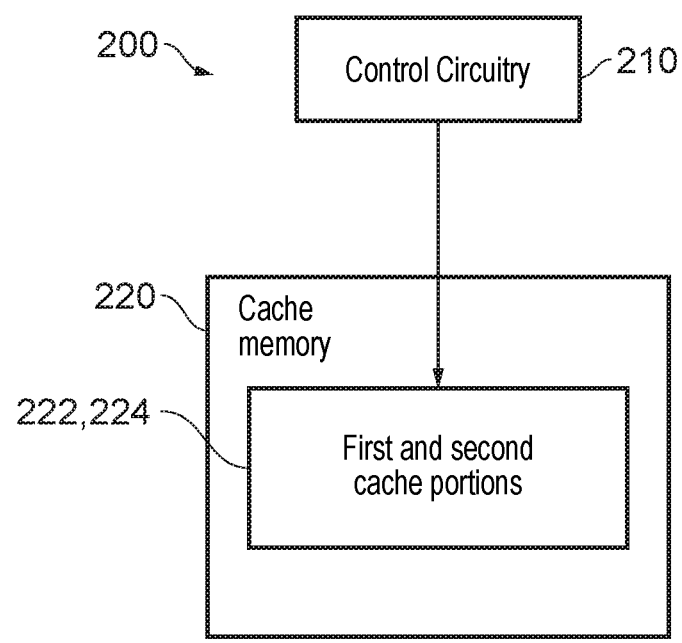
FIG. 10 schematically illustrates circuitry 100 comprising a cache memory, the cache memory comprising a memory region common to the first and second cache portions.

FIG. 10 schematically illustrates the circuitry 200 in which the cache memory 220 comprises a memory region common to the first and second cache portions. The first cache portion 222 and the second cache portion 224 may share a common portion of the cache memory 220 such that data predicted to comprise streaming data and data predicted to comprise multiple-access data can both be stored in a common portion of the cache memory 220. In order to distinguish between the cache lines stored in the first portion and the second portion, the cache memory 220 can be configured to store flag data in association with the stored cache line. For example, flag data may be stored with each stored cache line in the shared portion of the cache memory 222 so that the flag data indicates whether a stored cache line is in the first cache portion or the second cache portion. Alternatively, flag data may only be stored in association with a cache line stored in the first cache portion so that detection of the presence of flag data associated with a cache line indicates that the stored cache line is in the first cache portion.

Therefore by storing flag data in association with a stored cache line, a stored cache line in the first cache portion can be identified and the first cache line eviction policy can be used for the stored cache lines in the first cache portion whereas the second cache line eviction policy can be used for the stored cache lines in the second cache portion. This means that when the shared memory region is fully occupied and a new cache line is to be stored in the shared memory region, the stored cache lines in the first cache portion can be distinguished from the stored cache lines in the second cache portion, and stored cache lines in the first cache portion can be preferentially evicted instead of evicting stored cache lines in the second cache portion. In response to a detection that the memory region common to the first and second cache portions is fully occupied when a next cache line is to be newly stored in the memory region, the control circuitry 210 can evict an earliest-stored cache line in the first cache portion. As such, as a first condition cache lines stored in the first cache portion are preferentially evicted and then of the stored cache lines in the first cache portion, an oldest cache line is preferentially evicted before a newest cache line.

For the case where the cache memory comprises a memory region common to the first and second cache portions and the cache memory is an n-way set associative cache memory, each set comprises n cache lines and at least one cache line from the set of cache lines is in the first cache portion, and the control circuitry 110 is configured, in response to a detection that the memory region common to the first and second cache portions is fully occupied when the given cache line is to be newly stored in the memory region, to evict the stored cache line in the first cache portion. For example, for a 4-way set associative cache memory having a memory region common to the first and second cache portions where each set comprises 4 cache lines, at least one of the cache lines of the set is in the first cache portion of the cache memory and the other cache lines of the set are in the second cache portion of the cache memory. The control circuitry 210 can store a given cache line in one of the first cache portion and the second cache portion of the memory region responsive to the prediction of whether the given cache comprises streaming data or multiple access data. When a given cache line is to be newly stored in the memory region common to the first and second cache portions and the memory region is fully occupied, the control circuitry 210 can evict a stored cache line from the set by selecting a cache line stored in the first cache portion for eviction. In this way, when the memory region shared by the first cache portion and the second cache portion is fully occupied, a stored cache line in the first cache portion can be preferentially evicted so that the next cache line can be newly stored in the shared memory region. In some examples, each set may comprise a plurality of cache lines in the first cache portion with the remaining cache lines of the set in the second cache portion. In this case, when the memory region shared by the first cache portion and the second cache portion is fully occupied, the control circuitry 210 can be configured to evict a stored cache line in the first cache portion by randomly selecting one of the stored cache lines in the first cache portion, or the control circuitry 210 can be configured to evict a stored cache line in the first cache portion by selecting an earliest-stored cache line in the first cache portion from the plurality of stored cache lines in the first cache portion.

As discussed previously, the control circuitry 210 is configured to store a next cache line in either the first cache portion or the second cache portion responsive to the prediction generated by the prediction circuitry. In examples, the circuitry 200 is provided comprising: the access circuitry 100 to access the data stored in the cache memory; the detection circuitry 150 to detect, for at least a set of sub-units of the cache lines stored in the cache memory, whether a number of accesses by the access circuitry to a given sub-unit exceeds the predetermined threshold, in which each sub-unit has a data size that is smaller than the data size of a cache line; the prediction circuitry 161 to generate the prediction, for a given region of a plurality of regions of physical address space, of whether data stored in that region comprises streaming data in which each of one or more portions of the given cache line is predicted to be subject to a maximum of one subsequent read operation or multiple access data in which each of the one or more portions of the given cache line is predicted to be subject to more than one subsequent read operation, the prediction circuitry 161 being configured to generate the prediction in response to a detection by the detection circuitry 150 of whether the number of accesses to a sub-unit of a cache line having an associated physical address in the given region exceeds the predetermined threshold.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device (such as a processing element as discussed above) may be programmed to perform the function. "Configured to" does not imply that the apparatus element needs to be changed in any way in order to provide the defined operation.

Although illustrative embodiments of the present techniques have been described in detail herein with reference to the accompanying drawings, it is to be understood that the present techniques are not limited to those precise embodiments, and that various changes, additions and modifications can be effected therein by one skilled in the art without departing from the scope and spirit of the techniques as defined by the appended claims. For example, various combinations of the features of the dependent claims could be made with the features of the independent claims without departing from the scope of the present techniques.

The invention claimed is:

1. Apparatus comprising:
a cache memory to store data as a plurality of cache lines each having a data size and an associated physical address in a memory;
access circuitry to access the data stored in the cache memory;
detection circuitry to detect, for at least a set of sub-units of the cache lines stored in the cache memory, whether a number of accesses by the access circuitry to a given sub-unit exceeds a predetermined threshold, in which each sub-unit has a data size that is smaller than the data size of a cache line;
prediction circuitry to generate a prediction, for a given region of a plurality of regions of physical address space, of whether data stored in that region comprises streaming data in which each of one or more portions of the given cache line is predicted to be subject to a maximum of one read operation or multiple access data in which each of the one or more portions of the given cache line is predicted to be subject to more than one read operation, the prediction circuitry being configured to generate the prediction in response to a detection by the detection circuitry of whether the number of accesses to a sub-unit of a cache line having an associated physical address in the given region exceeds the predetermined threshold; and
allocation circuitry to selectively allocate a next cache line to the cache memory in dependence upon the prediction applicable to the region of physical address space containing that next cache line.

2. Apparatus according to claim 1, in which the predetermined threshold is one.

3. Apparatus according to claim 1, in which each region of physical address space is larger than one cache line.

4. Apparatus according to claim 1, in which the detection circuitry is configured to store indicator data indicative of at least a first access to a sub-unit in the set of sub-units, and to detect a subsequent access to a sub-unit in response to the stored indicator data.

5. Apparatus according to claim 4, in which the detection circuitry is configured to invalidate the stored indicator data for a given sub-unit in response to one or more from the list consisting of:

a detection that the number of accesses by the access circuitry to the given sub-unit exceeds the predetermined threshold; and a detection that the cache line comprising the given sub-unit has been evicted from the cache memory.

6. Apparatus according to claim 1, in which the prediction circuitry is configured to store count data for at least the given region of the physical address space in the memory, the count data indicative of a number of sub-units having an associated physical address in the given region for which the number of accesses by the access circuitry exceeds the predetermined threshold.

7. Apparatus according to claim 6, in which the prediction circuitry is configured to store the count data for each region of the plurality of region of the physical address space in the memory.

8. Apparatus according to claim 6, in which the prediction circuitry is configured to update the count data for the given region to indicate a greater number of sub-units in response to a first detection that a number of accesses by the access circuitry to a given sub-unit having an associated physical address in the given region exceeds the predetermined threshold.

9. Apparatus according to claim 6, in which the prediction circuitry is configured to update the count data for the given region to indicate a smaller number of sub-units in response to a detection that a cache line comprising a sub-unit having an associated physical address in the given region is evicted from the cache memory when a number of accesses by the access circuitry to the sub-unit is less than or equal to the predetermined threshold.

10. A method comprising:
storing, in a cache memory, data as a plurality of cache lines each having a data size and an associated physical address in a memory;
accessing the data stored in the cache memory;
detecting, for at least a set of sub-units of the cache lines stored in the cache memory, whether a number of accesses to a given sub-unit exceeds a predetermined threshold, in which each sub-unit has a data size that is smaller than the data size of a cache line;
generating a prediction, for a given region of a plurality of regions of physical address space, of whether data stored in that region comprises streaming data in which each of one or more portions of the given cache line is predicted to be subject to a maximum of one subsequent read operation or multiple-access data in which each of the one or more portions of the given cache line is predicted to be subject to more than one subsequent read operation, in which the prediction is generated in response to a detection of whether the number of accesses to a sub-unit of a cache line having an associated physical address in the given region exceeds the predetermined threshold; and
selectively allocating a next cache line to the cache memory in dependence upon the prediction applicable to the region of physical address space containing that next cache line.

11. Circuitry comprising:
a cache memory to store data as a set of cache lines, the cache memory having a first cache portion and second cache portion, the first and second cache portions having different cache line eviction policies; and
control circuitry, responsive to a prediction of whether a given cache line to be newly stored in the cache memory comprises streaming data in which each of one or more portions of the given cache line is predicted to be subject to a maximum of one subsequent read operation or multiple access data in which each of the one or more portions of the given cache line is predicted to be subject to more than one subsequent read operation, to store the given cache line in the first cache portion when the prediction indicates that the given cache line comprises streaming data and to store the given cache line in the second cache portion when the prediction indicates that the given cache line comprises multiple-access data.

12. Circuitry according to claim 11, in which the first cache portion and the second cache portion each comprise a respective memory region, and the first cache portion holds a smaller number of cache lines than the second cache portion.

13. Circuitry according to claim 12, in which the control circuitry is configured, in response to a detection that the first cache portion is fully occupied when the given cache line is to be newly stored in the first cache portion, to evict an earliest-stored cache line from the first cache portion.

14. Circuitry according to claim 12, comprising read circuitry to retrieve a required cache line from the cache memory, the read circuitry being configured to detect whether the required cache line is stored in either the first cache portion or the second cache portion.

15. Circuitry according to claim 11, in which the cache memory comprises a memory region common to the first and second cache portions, the cache memory being configured to store flag data associated with a stored cache line to indicate whether that stored cache line is in the first cache portion or the second cache portion.

16. Circuitry according to claim 15, in which the control circuitry is configured, in response to a detection that the memory region common to the first and second cache portions is fully occupied when the given cache line is to be newly stored in the memory region, to evict any stored cache line in the first cache portion.

17. Circuitry according to claim 15, in which the control circuitry is configured, in response to a detection that the memory region common to the first and second cache portions is fully occupied when the given cache line is to be newly stored in the memory region, to evict an earliest-stored cache line in the first cache portion.

18. Circuitry according to claim 15, in which the cache memory is an n-way set associative cache memory in which each set comprises n cache lines and at least one cache line from the set of cache lines is in the first cache portion, and the control circuitry is configured, in response to a detection that the memory region common to the first and second cache portions is fully occupied when the given cache line is to be newly stored in the memory region, to evict the stored cache line in the first cache portion.

19. Circuitry according to claim 11, in which:
each cache line has a data size and an associated physical address in a memory;
the circuitry comprising:
access circuitry to access the data stored in the cache memory;
detection circuitry to detect, for at least a set of sub-units of the cache lines stored in the cache memory, whether a number of accesses by the access circuitry to a given sub-unit exceeds a predetermined threshold, in which each sub-unit has a data size that is smaller than the data size of a cache line;
prediction circuitry to generate the prediction, for a given region of a plurality of regions of physical address space, of whether data stored in that region comprises streaming data in which each of one or more portions of the given cache line is predicted to be subject to a maximum of one subsequent read operation or multiple access data in which each of the one or more portions of the given cache line is predicted to be subject to more than one subsequent read operation, the prediction circuitry being configured to generate the prediction in response to a detection by the detection circuitry of whether the number of accesses to a sub-unit of a cache line having an associated physical address in the given region exceeds the predetermined threshold.

20. A method comprising:

storing data as a set of cache lines in a cache memory having a first cache portion and second cache portion, the first and second cache portions having different cache line eviction policies; and responsive to a prediction of whether a given cache line to be newly stored in the cache memory comprises streaming data in which each of one or more portions of the given cache line is predicted to be subject to a maximum of one subsequent read operation or multiple access data in which each of the one or more portions of the given cache line is predicted to be subject to more than one subsequent read operation, storing the given cache line in the first cache portion when the prediction indicates that the given cache line comprises streaming data and storing the given cache line in the second cache portion when the prediction indicates that the given cache line comprises multiple-access data.

* * * * *